(12) United States Patent
Watson

(10) Patent No.: US 8,271,379 B1
(45) Date of Patent: Sep. 18, 2012

(54) SYSTEMS AND METHODS FOR BUILDING A PERSONALIZED ACCOUNT

(75) Inventor: Andrew Watson, Southlake, TX (US)

(73) Assignee: Universal Card Services Corp., Jacksonville, FL (US)

( * ) Notice: Subject to any disclaimer, the term of this patent is extended or adjusted under 35 U.S.C. 154(b) by 0 days.

(21) Appl. No.: 09/453,800

(22) Filed: Dec. 3, 1999

Related U.S. Application Data

(60) Provisional application No. 60/111,028, filed on Dec. 4, 1998.

(51) Int. Cl.
*G06Q 40/00* (2012.01)
(52) U.S. Cl. .......................................... 705/39
(58) Field of Classification Search ............... 705/35–42
See application file for complete search history.

(56) References Cited

U.S. PATENT DOCUMENTS

| | | | |
|---|---|---|---|
| 5,239,462 A | 8/1993 | Jones et al. | 364/408 |
| 5,611,052 A | 3/1997 | Dykstra et al. | 395/238 |
| 5,699,527 A | 12/1997 | Davidson | 395/238 |
| 5,724,523 A | 3/1998 | Longfield | 395/235 |
| 5,774,882 A * | 6/1998 | Keen | 705/38 |
| 5,809,478 A | 9/1998 | Greco et al. | 705/4 |
| 5,866,889 A | 2/1999 | Weiss et al. | 235/379 |
| 5,870,721 A | 2/1999 | Norris | 705/38 |
| 5,878,403 A * | 3/1999 | DeFrancesco | 705/38 |
| 5,915,006 A * | 6/1999 | Jagadish et al. | 379/115.01 |
| 5,950,179 A * | 9/1999 | Buchanan | 705/38 |
| 5,970,478 A * | 10/1999 | Walker et al. | 705/35 |
| 6,088,686 A * | 7/2000 | Walker | 705/38 |
| 6,324,524 B1 | 11/2001 | Lent et al. | 705/38 |
| 6,386,444 B1 * | 5/2002 | Sullivan | 235/379 |
| 6,434,534 B1 * | 8/2002 | Walker et al. | 705/14 |

FOREIGN PATENT DOCUMENTS

EP  1067 772 A1 * 10/2001

OTHER PUBLICATIONS

CrediCardsPLUS.com.*
Business Editors, Internet/E-Commerce Writers. "NextCard Internet Visa Considered Number One Credit Card Brand by Internet Consumers." Business Wire, New York: Nov. 8, 1999. p. 1.*
Discover Cares Enough to Send the Very Best. Credit Risk Management Report. Potomac: Nov. 15, 1999; vol. 9, Iss, 22; p. 1.*

* cited by examiner

*Primary Examiner* — Hani M Kazimi
(74) *Attorney, Agent, or Firm* — Eric L. Sophir; SNR Denton US LLP

(57) ABSTRACT

The present invention allows an applicant to apply for an account based service via a network connection. When an applicant applies for the account based service, he or she is supplied with features that enhance the value of the account based service. The applicant may select from the features provided, determine how this selection may affect the value of the account based service in relation to its cost and determine if he or she wishes to receive the account based service with the added features. Examples of account based services include credit cards, insurance accounts and telecommunications accounts.

16 Claims, 29 Drawing Sheets

- 270 Company A Insurance
- 271 Type of Insurance | Amount | Yearly Fees | Account No.
- 272 Applicant Name | Applicant Number
- 273 HOME / RENTER'S
- 274 $10,000 / $20,000 / $30,000 / $40,000 / $50,000 / $60,000 / $70,000 / $80,000 / $90,000 / $100,000 / $200,000 / $300,000
- 276 Personal Injury and Property: 10/20/10, 20/50/20, 100/75/100, 200/100/200
- 277 Collision Deductible: $100, $200, $300
- 275 Auto
- 278 Comprehensive: $10,000, $20,000, $30,000
- 279 Life: $10,000, $20,000, $30,000, $40,000, $50,000, $60,000, $70,000
- 280 Phone Service From Company X
- 281 Invest With Company Y
- 282 Automatic Payment
- 283 RESET
- 284 FINISH
- 285 EXPLANATION:

SYSTEMS AND METHODS FOR BUILDING A PERSONALIZED ACCOUNT

CONTINUING DATA

This application claims the benefit of U.S. Provisional Application No. 60/111,028, entitled "SYSTEMS AND METHODS FOR BUILDING A PERSONALIZED ACCOUNT", filed on Dec. 4, 1998, incorporated herein by reference.

FIELD OF THE INVENTION

This invention relates to a network site, such as a Web site on the World Wide Web or the Internet, that an applicant accesses in order to select services, options, payment plans and annual fees associated with an account-based service, such as a credit card, insurance or communication services.

BACKGROUND

Many people purchase account-based services over the phone or through paper applications they fill out and return to the account service provider. Account-based services such as insurance, communications and investment portfolios are typically purchased in this manner.

Another example of such an account based service includes traditional credit card applications. Typically, an application for a credit card is a form that an applicant either receives from the credit card issuing institution directly through the mail or finds in advertisements in books and magazines or on kiosks and bulletin boards. These forms have only one or two credit card choices and do not allow the applicant the opportunity to select features on the credit card. For example, some traditional paper forms only allow the applicant to order either a VISA® or a MasterCard® credit card, but a single form will not provide the applicant with a choice between the two.

Other advertisements or forms traditionally support a particular program, such as frequent flier miles or reduced rates on long distance services. Thus, an applicant typically only chooses the type of card (e.g., VISA® or MasterCard®) and nothing else. The choice as to which service or options the applicant receives with the card is performed by selecting the form associated with that service or option (e.g., mailing in a frequent flyer credit card application as opposed to a discounted long distance service credit card application).

Presently, financial institutions have begun to offer credit cards, and other institutions have begun to offer other account-based services, such as insurance, via electronic forms over the Internet or World Wide Web. Typically, an applicant accesses a particular Web site and then selects from a few choices (e.g., VISA® or MasterCard® and frequent flyer miles or reduced long distance). This current form of electronic filing for a credit card suffers from at least four problems.

The first problem is the delay in obtaining the credit card. The issuing financial institution performs a credit check after the applicant exits the Web page. The applicant must wait for the credit check to be done and then wait to receive the new credit card some time later. At the point of receiving the credit card, the applicant may first learn that the credit line extended is unacceptable, after having gone through the effort and the wait associated with applying for the credit card. Additionally, the applicant must also wait to receive the new credit card before it can be used.

Second, the applicant is not given the option to select across multiple internal and external services. Typically, a Web site offers multiple cards (e.g., frequent flier mile cards, reduced long distance cards, cards with points for purchasing automobiles, and points for purchasing electronic goods), but the applicant must chose one amongst all of these cards. Thus, an applicant cannot opt to receive multiple services from a single credit card.

Third, traditional credit card applications do not provide the applicant with options relating to other banking services. For example, most credit cards do not allow for a reduced annual percentage rate (APR) if the card holder decides to take advantage of some additional services, such as on-line banking. Additionally, the issuing institution does not typically provide a reduced APR if the card holder uses other services, such as electronic checks, to make payments to the credit card account.

Fourth, traditional methods and systems for ordering credit cards do not allow an applicant to select a plurality of services and options in exchange for a higher annual fee or APR. Thus, an applicant who wishes to have two or more services or options associated with a single card cannot elect to do so in exchange for paying a higher annual fee or APR.

Other account-based services may also be purchased using either phone conversations with a customer representative, a mail-in form or a Web page application. This method of purchasing other account-based services, such as insurance, suffers from at least three problems. The first is that a background check on the applicant is required to assure that the applicant is a good candidate to receive the account-based service. This typically takes a long time and may delay issuance of the account.

Second, a customer service representative may fail to notice the multiple policy or sub-account customer. Thus, as an example, the representative may fail to notice that an applicant holds both a homeowner's policy, as well as two automobile policies, and as a result would be entitled to a discounted rate in all policies due to the applicant's brand loyalty to one particular insurance company.

Third, a problem exists in paper forms, in that as the number of available options, such as types of coverage (e.g., home, auto, life) increases, as well as the levels of coverage (e.g., $10,000, $20,000), the number of possible variations in rates increases such that to print out every rate within the vast amount of parameters is difficult and confusing to the applicant. Similarly, a customer service representative may make mistakes in conveying or may neglect to offer a reduced rate for multiple policies at various levels of coverage.

As noted in the examples given above, it is not the type of account (e.g., insurance vs. credit card) that typically creates the difficulty with conveying the information to the applicant, it is the number of options available. Similarly, problems occur with telecommunication service applicants regarding whether or not an applicant desires to purchase phone service and the associated features of call-waiting, call-forwarding, messaging services and caller-ID, along with other services, such as Internet access, paging, mobile phone service, cable television and satellite television. Given the large number of sub-services and options within some services, it is also difficult to convey all of the various rates to the applicant based on which sub-services, options and features are selected.

SUMMARY OF THE INVENTION

The present invention solves the problems noted above. First, with regard to credit card accounts, the present invention performs a real-time credit check to determine the credit worthiness of the applicant. The applicant, in an embodiment of the present invention, knows immediately what the line of credit is, as well as the credit card number, allowing the person to make purchases over the Internet, World Wide Web or telephone immediately after ordering the credit card.

Second, an embodiment of the present invention allows an applicant to select any number of services and options from a finite and variable plurality of services and options, and combine those selected services and options on one credit card. By allowing an applicant to select multiple services and options onto one card, the applicant may take advantage of special incentives offered by the issuing institution or its business partners, including a lower annual fee or a lower Annual Percentage Rate ("APR"). Alternatively, an applicant who values a plurality of other services, options and benefits may pay a higher annual fee in exchange for that package of services, options and benefits.

Third, the present invention allows an applicant to shop for a particular credit card and make choices based on an increased annual fee and/or APR as calculated in real time. An applicant may first desire to have two services or options on one card, but may be discouraged at the increased annual fee or APR. Thus, a potential credit card holder may temporarily select a plurality of services and options, receive a calculated annual fee or APR and then make alternate selections in an effort to lower the annual fee or APR before committing to a particular package of services, options and benefits on one card.

Fourth, the present invention allows the card issuing institution to modify and change the Web page easily and quickly. This allows the card issuing institution to bring in additional business partners as well as cancel services or options that become unprofitable or obsolete.

Finally, the present invention is also applicable to any account-based system. The present invention provides an adjustable and dynamic medium to purchase other account-based services, such as insurance, communications services, investments, loans and mortgages. For these non-credit card based accounts, the present invention also provides real-time approval for services and an institutionally changeable "select-and-see" platform that allows applicants to temporarily select from a plurality of options before committing to a single account while also providing the institution the flexibility to change the platform in the future.

In order to achieve the stated and other features, and advantages of the present invention, an embodiment of the present invention provides a method encompassing determining the worthiness of an applicant, providing a plurality of options from which the applicant can choose to associate with an account, adjusting factors associated with the account and submitting to the applicant selected information for providing the account.

BRIEF DESCRIPTION OF THE DRAWINGS

The accompanying drawings, which are incorporated in and form part of the specification, illustrate preferred embodiments of the present invention and, together with the description, disclose the principles of the invention.

FIGS. 5-26 are examples of Graphical User Interface (GUI) screens for application for a credit card in accordance with the methods and systems of an embodiment of the present invention.

FIG. 27 is a diagram of a screen showing various options from which an applicant has to choose when using the systems and methods of an embodiment of the present invention to purchase insurance.

DETAILED DESCRIPTION

Figure 1:
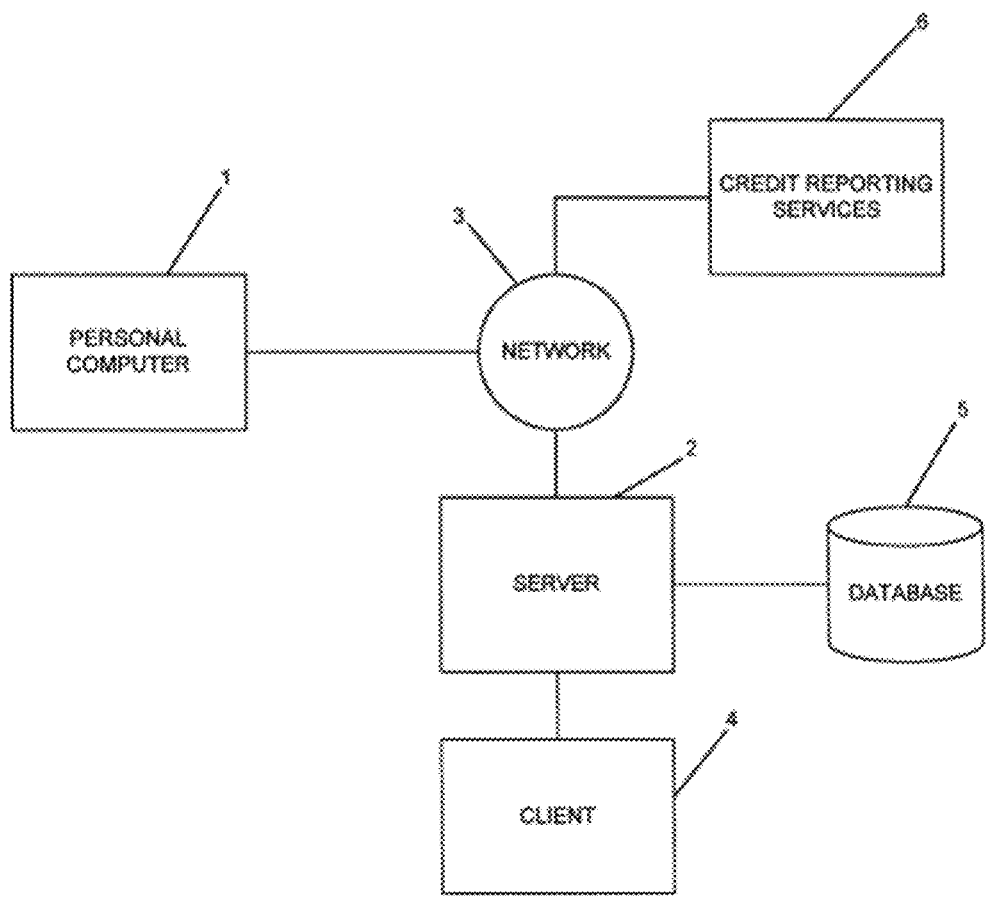
FIG. 1 is a system overview according to an embodiment of the present invention.

FIG. 1 shows a system overview of the present invention used by an account based service provider to offer account based services to an applicant and also used by applicants to develop, order, purchase and learn about certain account based services offered by the account based service provider. Examples of account based service providers include banks, financial institutions, insurance institutions, investment companies and telecommunications service providers. In one embodiment, an applicant uses terminal 1, such as a personal computer, to access a credit card building system, in which the applicant builds and designs a desired credit card or other account-based service. The credit card building system contains an interface for the applicant to receive and input data. Examples of the applicant interface may be a Graphic User Interface (GUI), a Web page or any equivalent device that presents the applicant with information and receives information from the applicant.

The applicant obtains access to the institution's credit card building system through network connection 3. Network 3 may be, for example, an internal network, an external network, the Internet, the World Wide Web or any combination thereof. The institution uses server 2 to store, forward, maintain and manage the credit card building system. Server 2 receives and transmits data to the applicant's computer 1 via network 3. Client terminal 4 is used to update and make changes to the operations of the software managed by server 2, including the credit card building system, and server 2 itself. Database 5 maintains records of services, options, benefits, annual fees, Annual Percentage Rates ("APRs"), available lines of credit and balance transfer amounts.

Outside of the institution is credit reporting service 6. This service 6 maintains its own database (not shown), which is used to determine if an applicant is a credit risk or not. Credit reporting service 6 returns information to server 2, via network 3, so it can be determined whether or not a credit card should be issued, and if one is issued, what the credit card's credit line should be.

Figure 2:
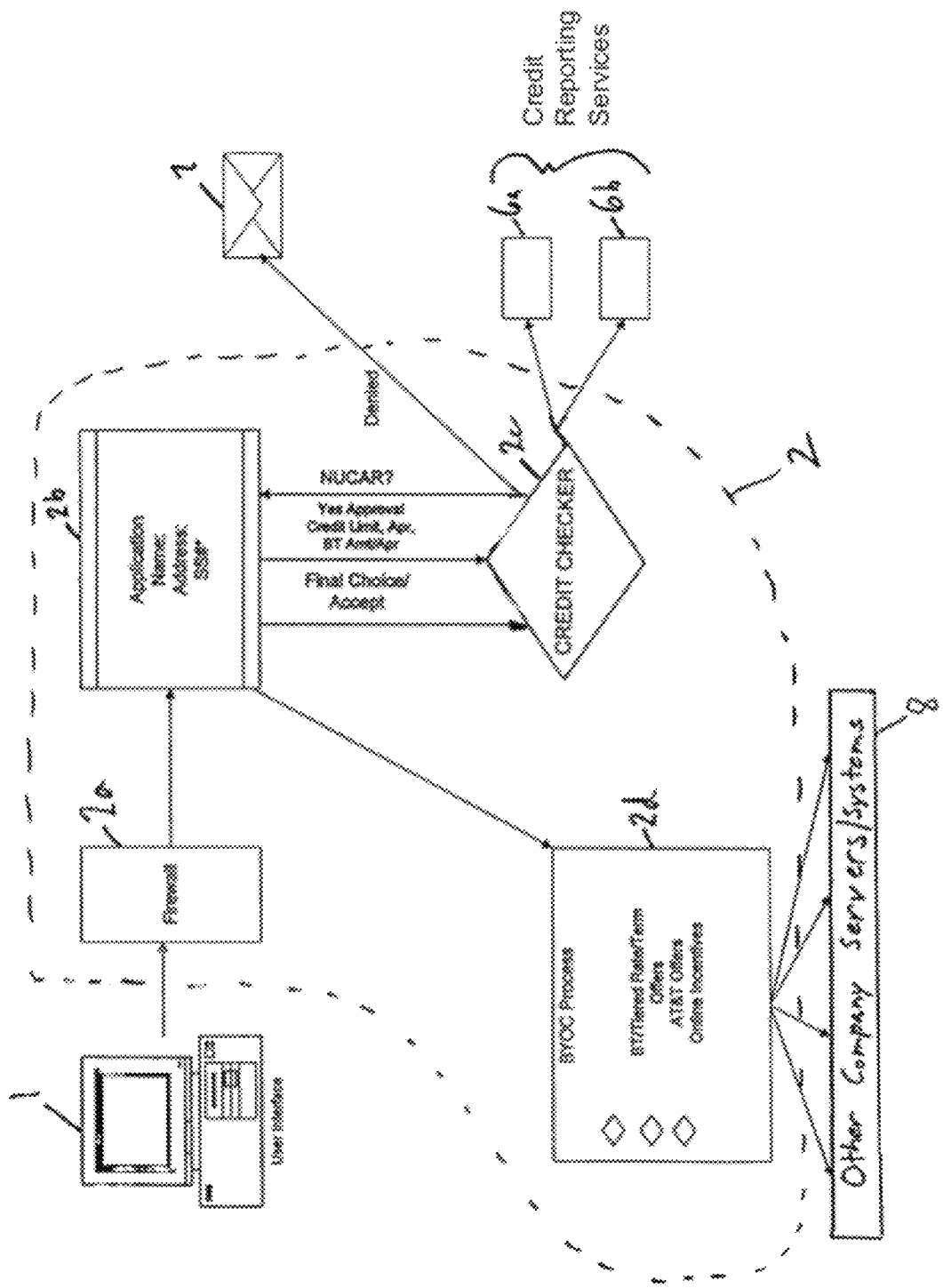
FIG. 2 is a system overview according to another embodiment of the present invention.

FIG. 2 shows another embodiment of the present invention. Part of server 2 is outlined in a dashed line. In particular, firewall 2a is used to limit access and to provide security to the institution's data and system. Firewall 2a basically includes security measures checking to assure that the person attempting to access the institution's server and information therein does not pose a substantial security risk.

Applicant information is obtained by applicant subsystem 2b. Applicant subsystem 2b prompts the applicant to enter data, such as the applicant's name, address, social security number and annual salary. Credit checker subsystem 2c retrieves the needed information from applicant subsystem 2b and forwards it to the appropriate credit scoring service 6a or 6b. If credit scoring service 6a or 6b provides a low enough score, such that credit checker subsystem 2c determines that the applicant is a bad credit risk, the system of an embodiment of the present invention mails the applicant denial letter 7 and switches the applicant to another Web page. Denial letter 7 basically states that the applicant will not be granted a credit card from this institution at this time. In an alternative embodiment of the present invention, denial letter 7 is immediately sent to the applicant as an e-mail message or a Web page.

If credit scoring service 6a or 6b provides a high enough credit score to merit issuing the applicant a credit card, credit checker subsystem 2c informs application subsystem 2b to issue a credit card to the applicant so that the appropriate information is forwarded to card building subsystem 2d from applicant subsystem 2b. Also, based upon the credit score and information provided by the applicant, credit checker subsystem 2c determines the credit line, the amount available for balance transfers (BT), and the APR and the APR for BTs, and provides this data to applicant subsystem 2a for forwarding to card building subsystem 2d.

Applicant subsystem 2b compiles the information provided by credit checker subsystem 2c, adds the applicant-provided information, and forwards both sets of data to card building subsystem 2d. Card building subsystem 2d receives applicant selections with respect to services, options and benefits, in order to build the desired credit card. The services, options and benefits are features an applicant adds to the credit card. Additionally, card building subsystem 2d accesses other company servers and systems 8 in order to determine what features the other companies are making available to the applicant should the applicant choose a particular service, option or benefit. Additionally, the other company servers and systems 8 may also provide advertisements in an effort to persuade the applicant to select a particular service. These advertisements are displayed to the applicant via card building subsystem 2d.

It should be noted that the subsystems 2a-2d of FIG. 2 can be implemented as modules onto a computer. The computer may be a mainframe or internet compatible server. The modules, in various preferred embodiments, may be implemented as hardware, software, firmware or any combination thereof onto computer 2.

Figure 3:
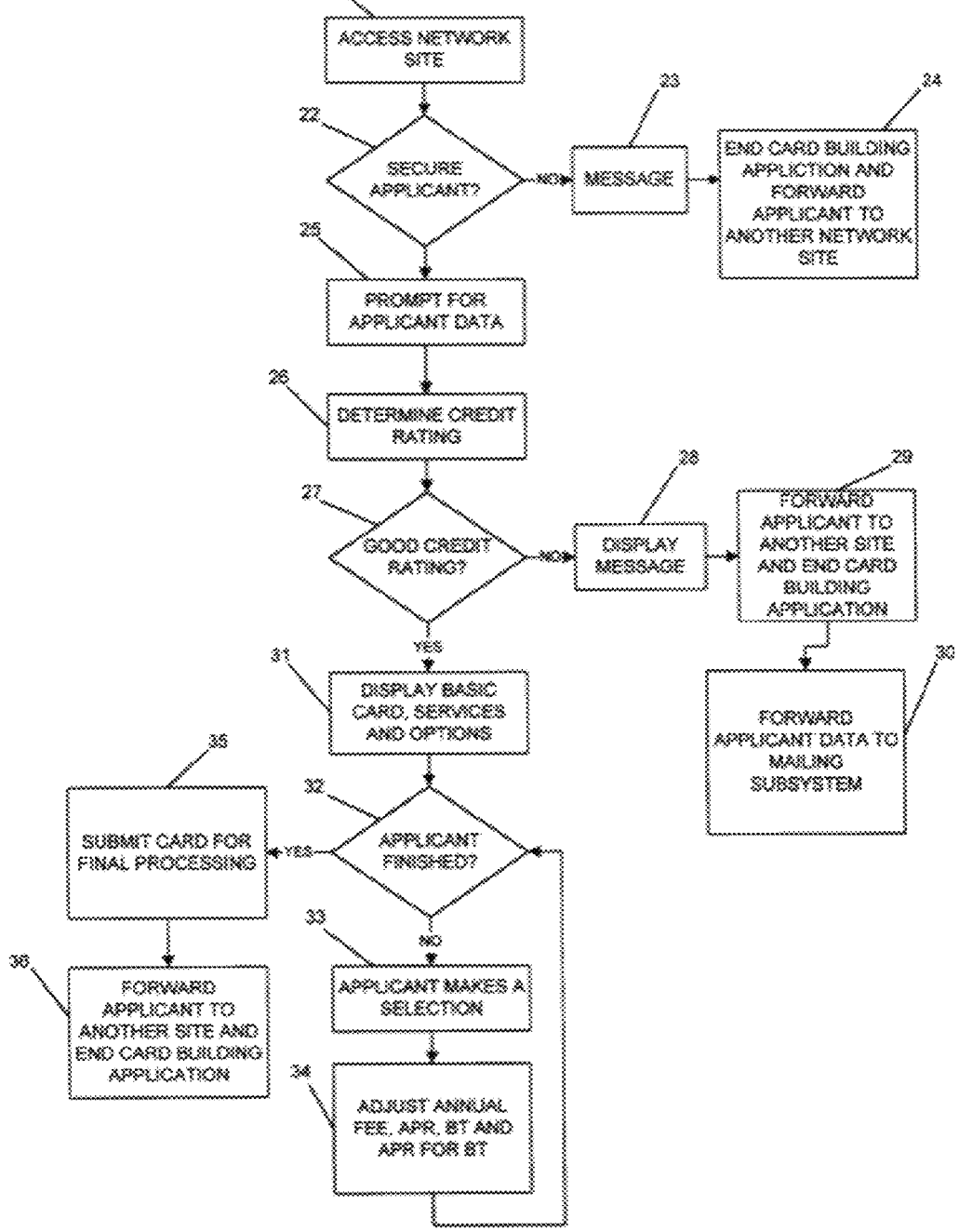
FIG. 3 is a flow chart showing a process in accordance with the present invention.

FIG. 3 is a flow chart showing the method blocks of building a personalized credit card according to an embodiment of the present invention. The process begins when an applicant invokes the card building system. This is usually accomplished when an applicant enters a Web site, or an equivalent, of an institution that issues credit cards at block 21 (Web page not shown). Typically, the institution is a bank, credit union or any other institution that issues credit cards. The initial Web site the applicant sees is typically the home page for the institution that the applicant wishes to have issue the credit card. After accessing the home page, the applicant selects or clicks on a link to the card building system or page at block 21.

At block 22, firewall 2a performs a security check on the applicant entering this part of the system. If firewall 2a determines that the applicant entering this part of the system is a security risk, the system forwards a message to the applicant informing the applicant that a credit card cannot be built at this time (block 23). After the applicant is so informed, the system terminates the credit card building application and returns the applicant to the institution's home page or another network site at block 24.

If the applicant passes firewall 2a security check at block 22, the applicant accesses applicant subsystem 2b at block 25.

Figure 5:
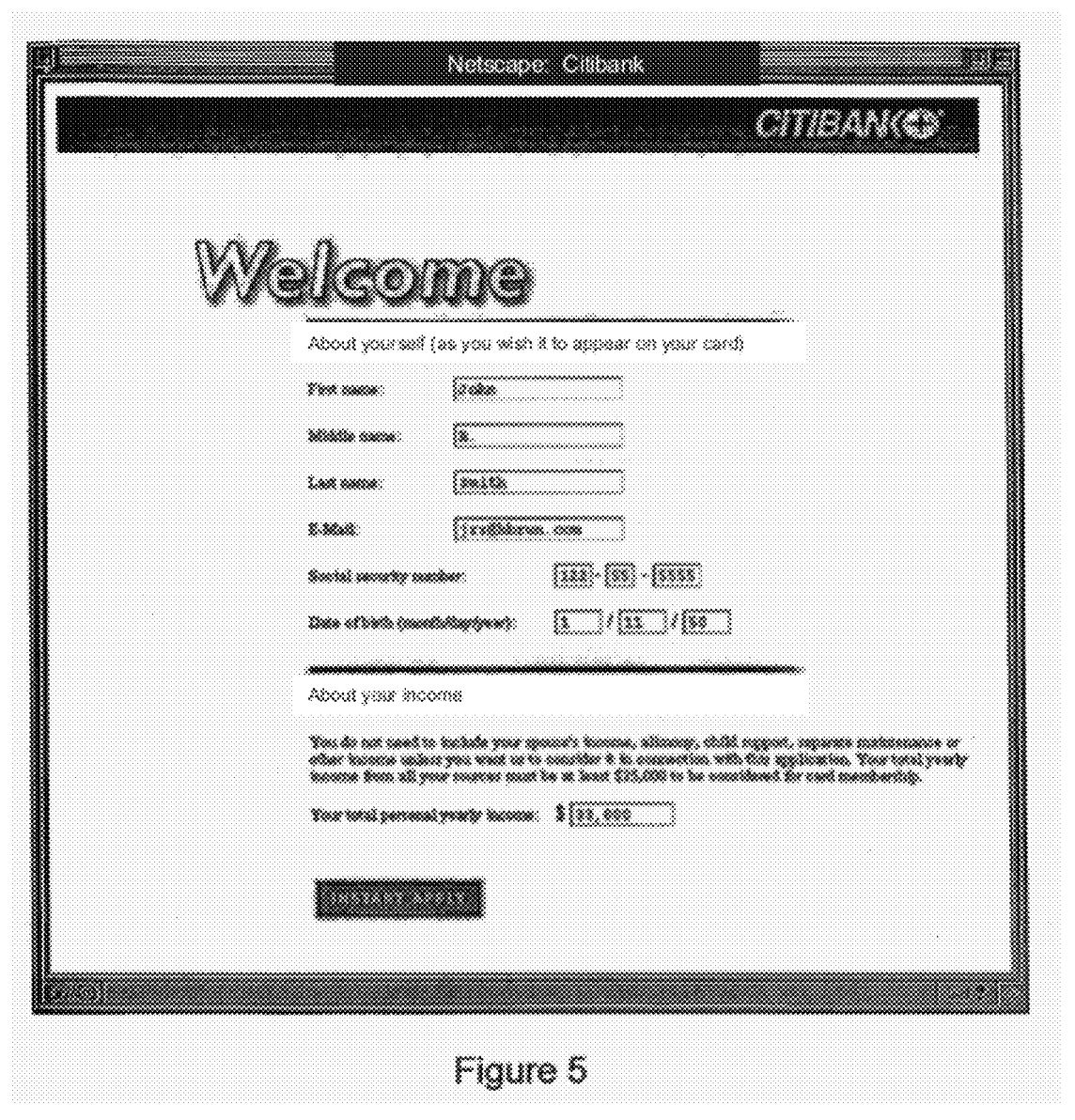

At block 25, applicant subsystem 2b queries the applicant to enter personal information, such as name, address, social security number and salary (see FIG. 5). Applicant subsystem 2b collects this information, formats it and forwards it to the credit checking subsystem 2c at block 26. Also at block 26, credit checking subsystem 2c forwards the formatted data to the appropriate credit checking agency 6a or 6b. Credit checking agency 6a or 6b derives the applicant's credit score based on such factors as salary, outstanding loans, and previous bankruptcy claims, and provides a credit report to credit checking subsystem 2c at block 26. Credit checking subsystem 2c uses the credit report to determine if the applicant qualifies for a credit card at block 27.

If credit checking subsystem 2c determines that the applicant is a bad credit risk at block 27, the system sends a brief message indicating that the applicant is no longer permitted to build a credit card at block 28 and forwards the applicant to another Web page or network site at block 29, which terminates the card building application. This alternative network site may typically be a phone service or other site which will try to persuade the applicant to purchase a secured phone card or other non-credit based service or product. Typically, this non-credit based service or product may be affiliated with a co-branding partner with the card issuing institution (e.g., a telephone company) or it may be another service provided by the card issuing institution (e.g., a checking account). At block 30, the applicant's name and address are forwarded to an employee or another subsystem so that denial letter 7 is generated and mailed to the applicant indicating that the applicant is a bad credit risk and will not be issued a credit card at this time.

If the credit checking subsystem 2c determines the applicant is a good credit risk at block 27, credit checking subsystem 2c forwards a base credit line, a base annual fee, a base annual percentage rate (APR), a base balance transfer amount (BT) and a base balance transfer APR to applicant subsystem 2b, which then forwards this information to card building subsystem 2d. This data is used to form a baseline offer. The applicant subsystem 2b also forwards the applicant data to card building subsystem 2d at block 31. In addition, at block 31 card building subsystem 2d displays an image of a basic credit card along with information about the credit card, such as the credit line, associated annual fee, the APR, the amount available for BTs and the APR for BTs. Also at block 31, card building subsystem 2d displays preference indicator choices related to services, options and benefits the applicant may select so as to add features to the credit card. The reader is referred to FIGS. 7-25 for examples. It should be noted that at this block, the card builder subsystem checks the credit line, APR, BT or APR for BTs to determine what services, options and benefits from which the applicant is allowed to select. In most cases, an applicant is allowed to chose from all services, options and benefits available from the issuing institution.

However, in an alternative embodiment of the present invention, some services and options are not made available to a particular applicant. For example, if an airline that offers frequent flyer miles does not want its program offered to people with credit limits below $5,000, that service is not displayed to those applicants. Thus, possible services and options available to an applicant are limited by the credit rating at this block.

At block 32, the applicant selects a service or option for association with the credit card being built. Typically this is done when the applicant actuates the preference indicator choices related to the desired service, option or benefit. The list of available services, options and benefits includes, but is not limited to, frequent flyer miles, points for automobile purchases, calling card services, points for purchasing electronics or music, the type of card (e.g., VISA® or MasterCard®), the addition of a microchip to make the card a smart card, the addition of the applicant's photograph, and linkage to checking accounts, on-line bill paying, investments and mortgages.

It should be noted that these various services, options and benefits are combinable in three ways. They are combinable in a cumulative manner, an alternative manner and a individual services, options and benefits form a plurality may be combinable in both a cumulative and an alternative manner. For example, the VISA™ and MasterCard™ options are applied in the alternative. An issued credit card is either a VISA™ card or a MasterCard™, but it cannot be both. In this example, the selection of one option automatically negates the selection of the other.

Figure 21:
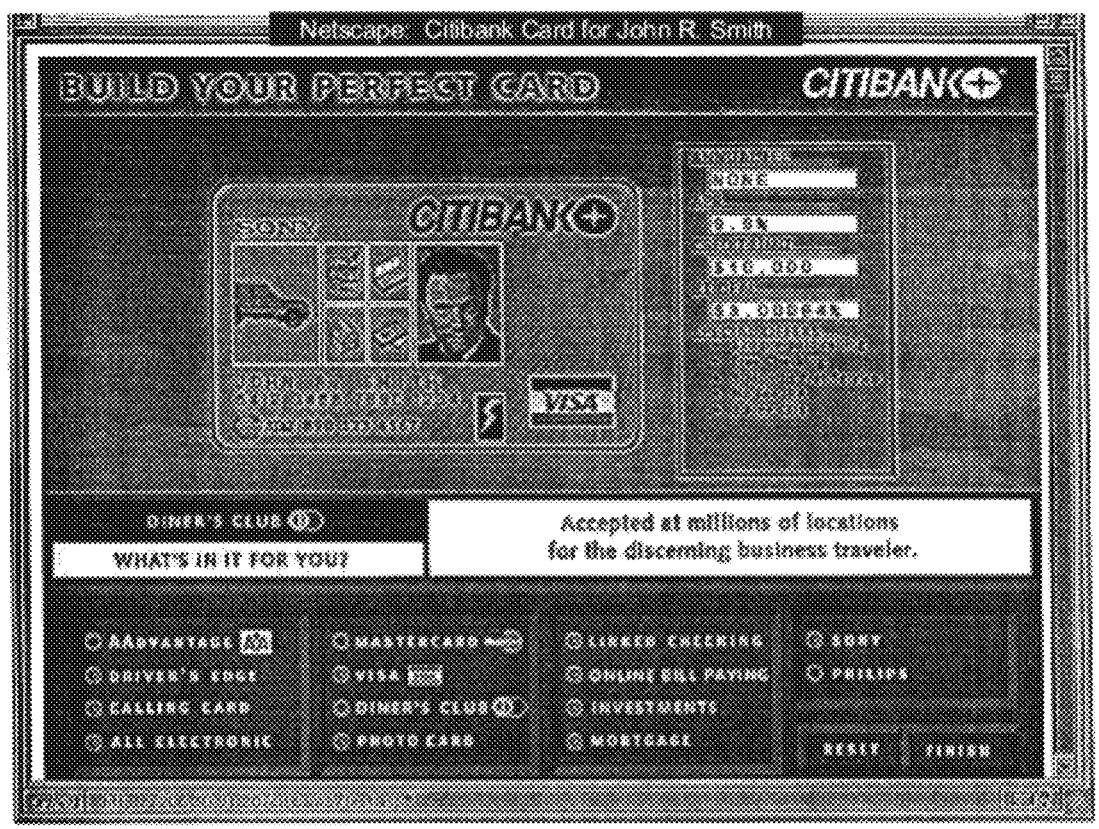
Figure 22:
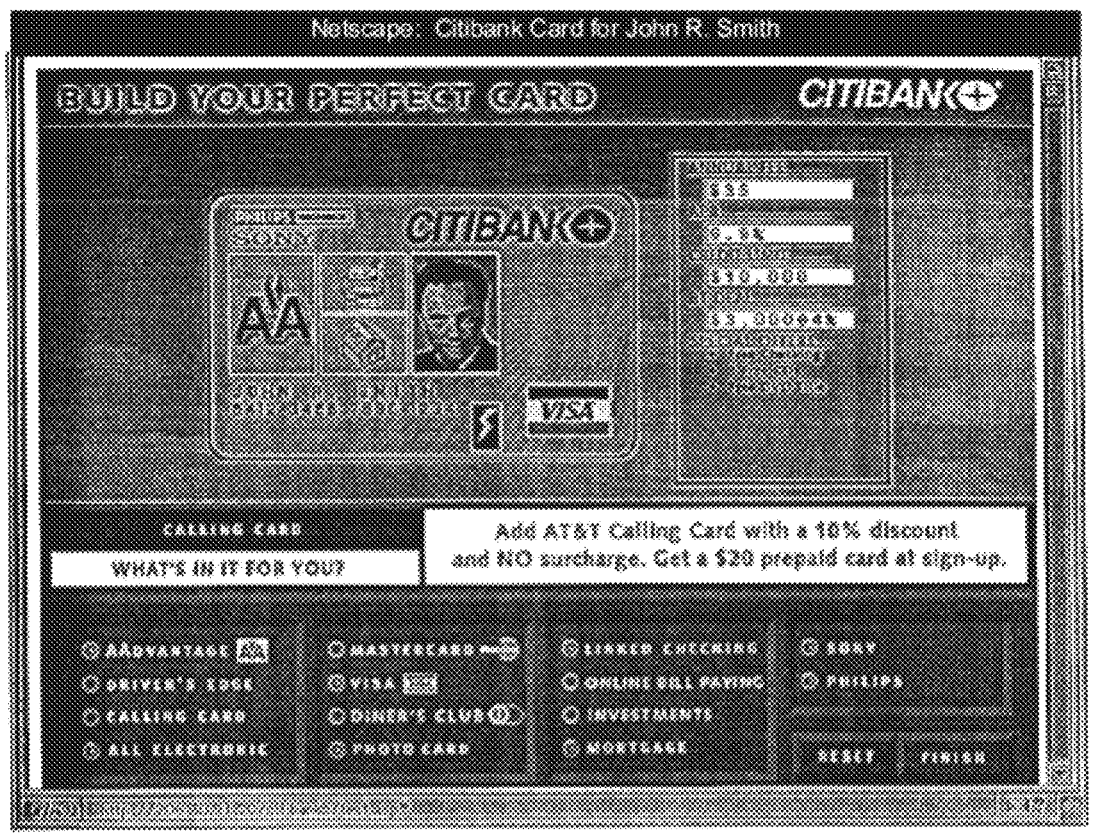
Figure 23:
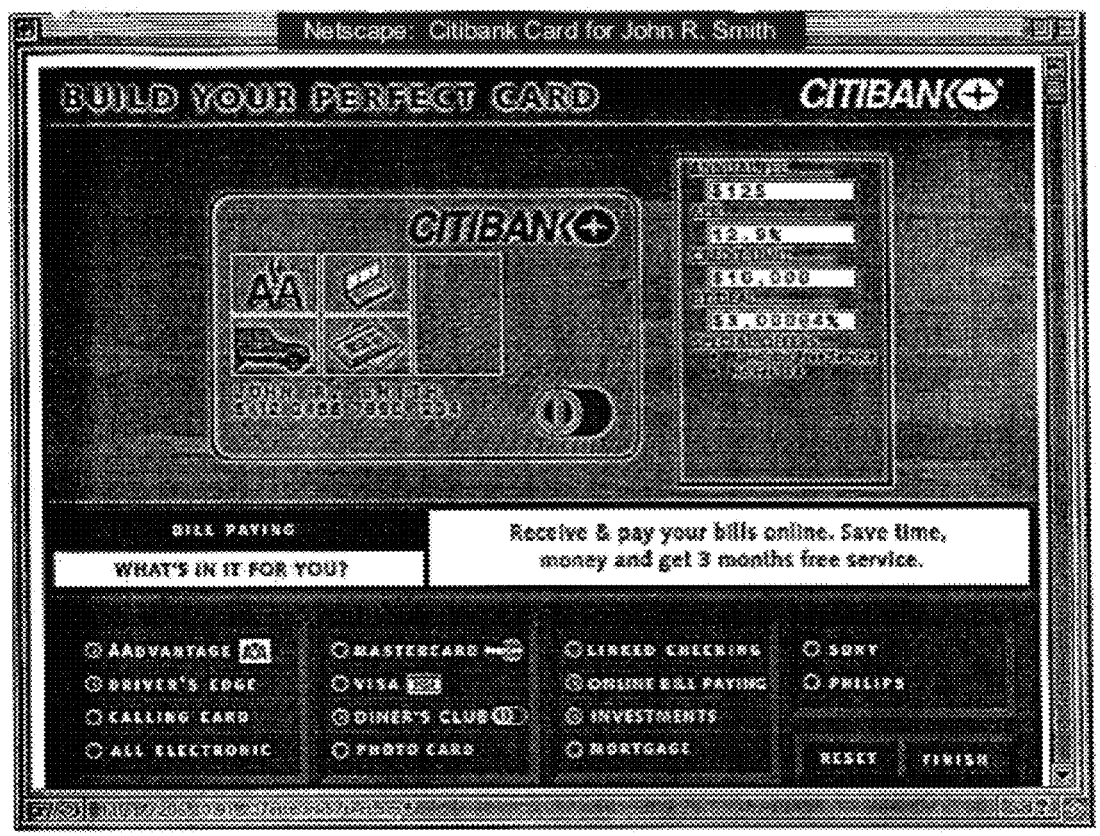
Figure 24:
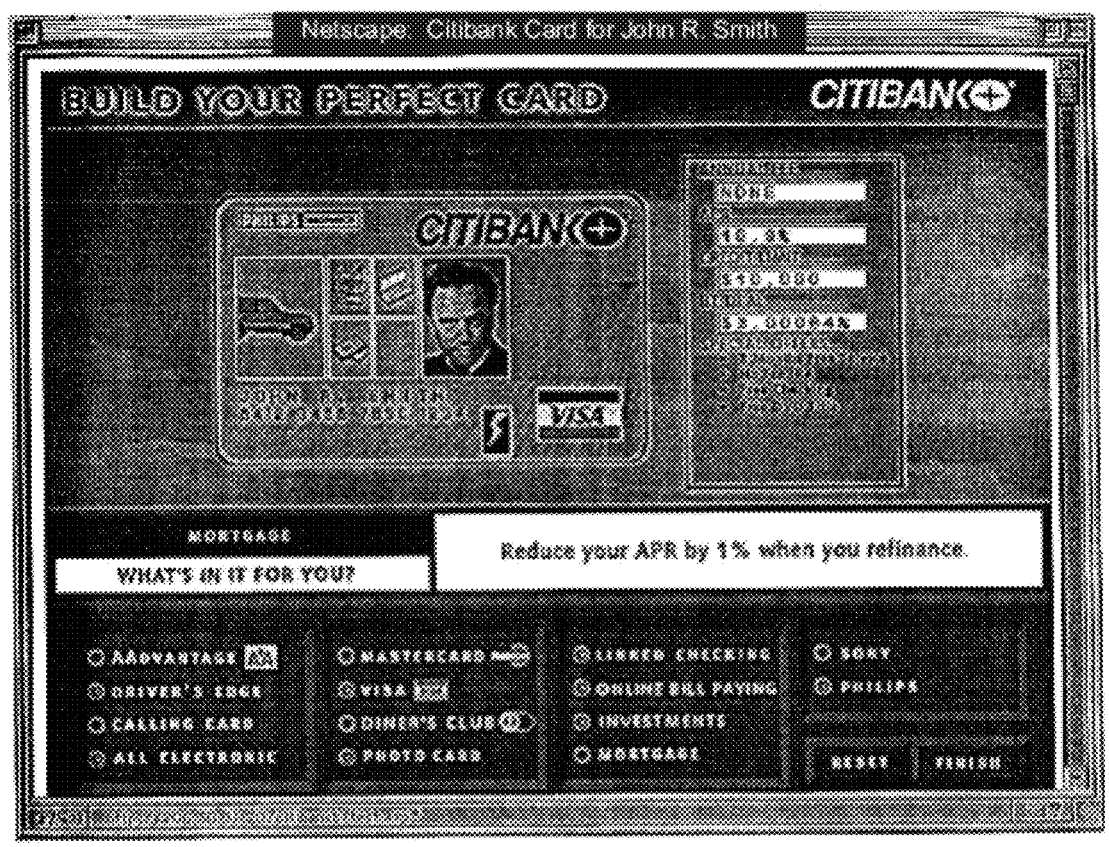
Figure 25:
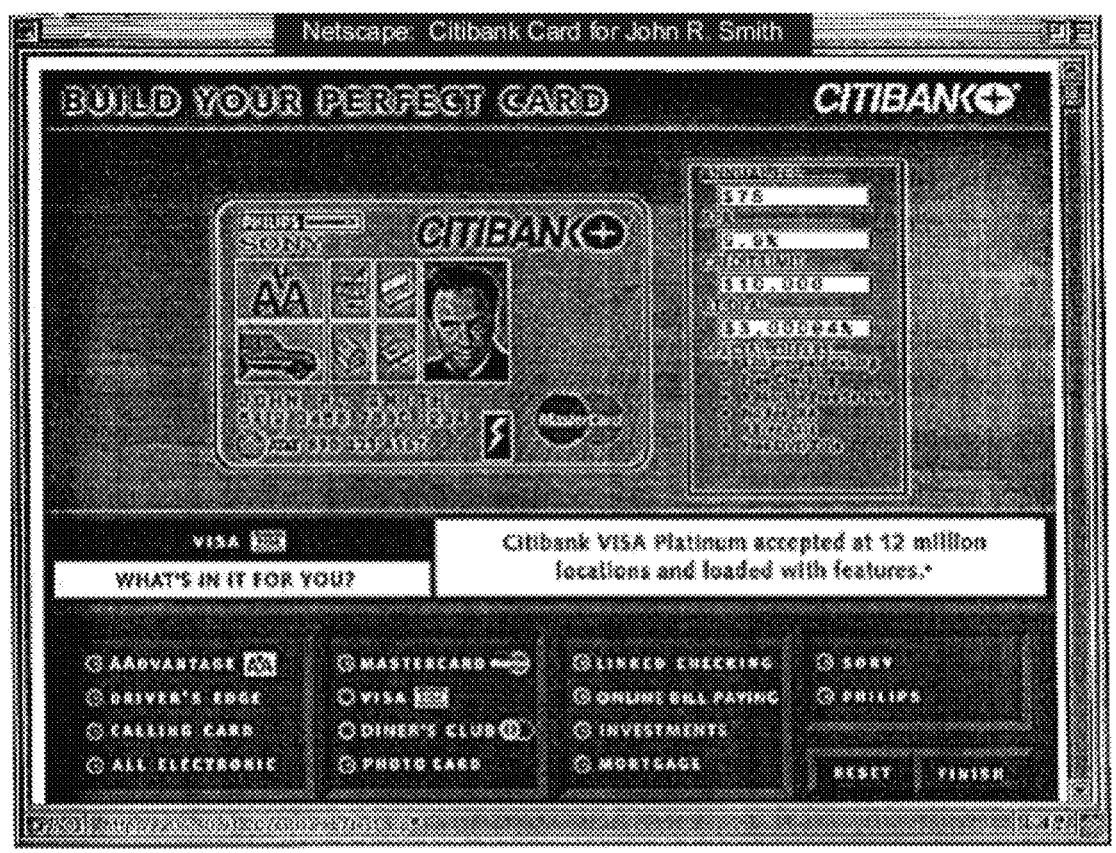

An example of cumulative services, options and benefits is shown in FIG. 21. The exemplary credit card shown has associated with it both the driver's edge service along with the electronic checking option. The manner and ways the services, options and benefits are permitted to be grouped is determined by the account based service provider.

Figure 26:
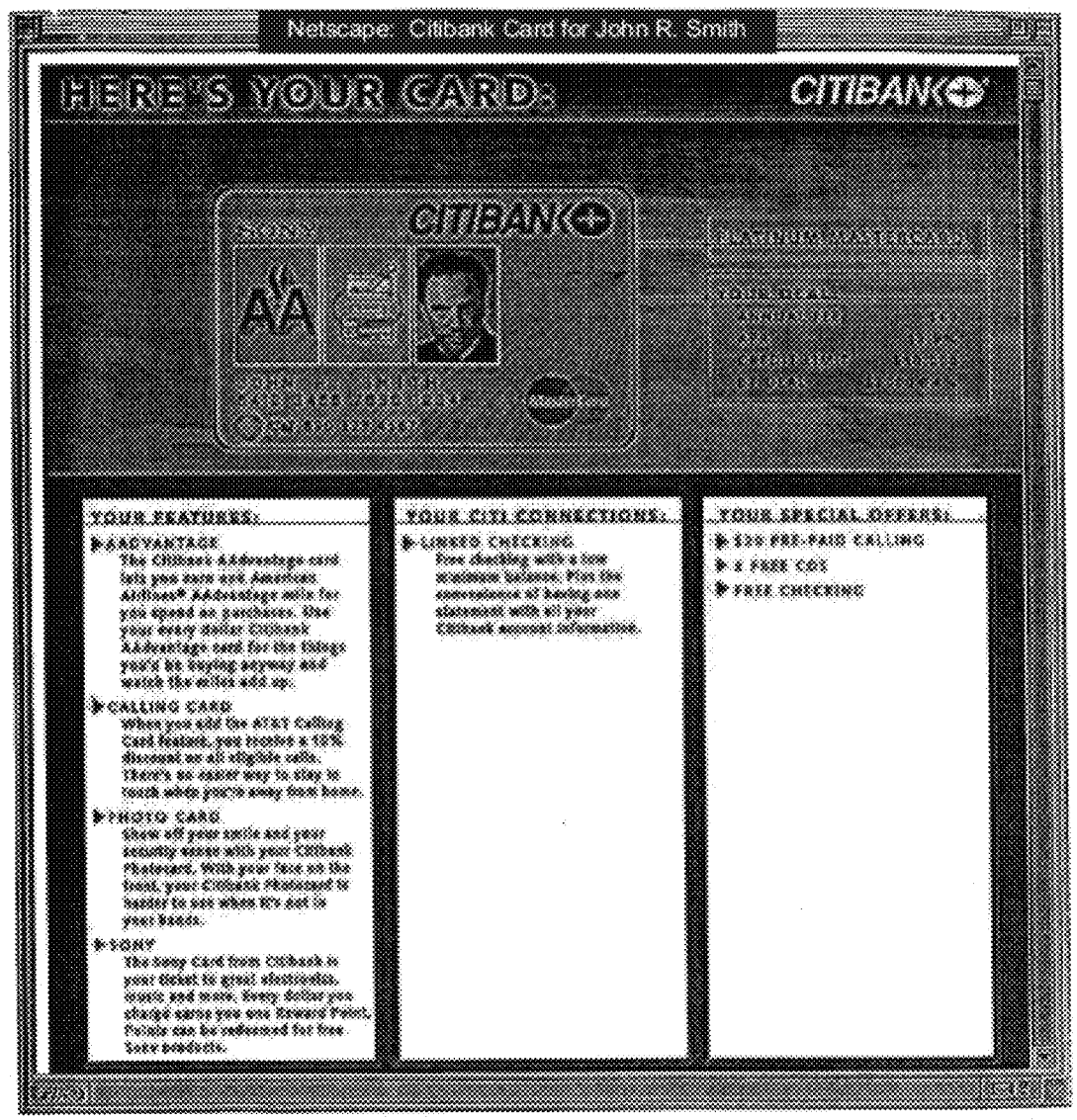

At block 32, the applicant decides if the base credit presented is sufficient for the applicant's needs. If it is, a "FINISH" command is inputted at block 32, and the base credit card is submitted at block 35 for final processing. Final processing typically includes providing the applicant with a summary of services selected, fees and APRs (FIG. 26), printing and mailing of the card to the applicant, as well as accessing external databases, such as the ones coupled to other company servers and systems 8. The accessing of external databases informs the other companies that the applicant has joined onto their services. In this manner, the applicant may use the calling card portion of the credit card before actually receiving the credit card because the other company's database is updated by the present invention, for example. After the base credit card is submitted at block 35, the applicant is switched over to another Web page and the process ends at block 36.

If at block 32, the applicant decides to add features to the basic credit card, the applicant uses a mouse or other pointing device, or uses the TAB key to shift through the available selections, and hits RETURN or a mouse button to select a particular service, option or benefit at block 33. After the applicant has made a selection at block 33, card building subsystem 2d takes that input and uses it to retrieve information from database 5. More specifically, card building subsystem 2d requests information so that the annual fee, APR, BT amount or APR for BT can be adjusted in view of the applicant's selection of a service, option or benefit at block 31.

Figure 4:
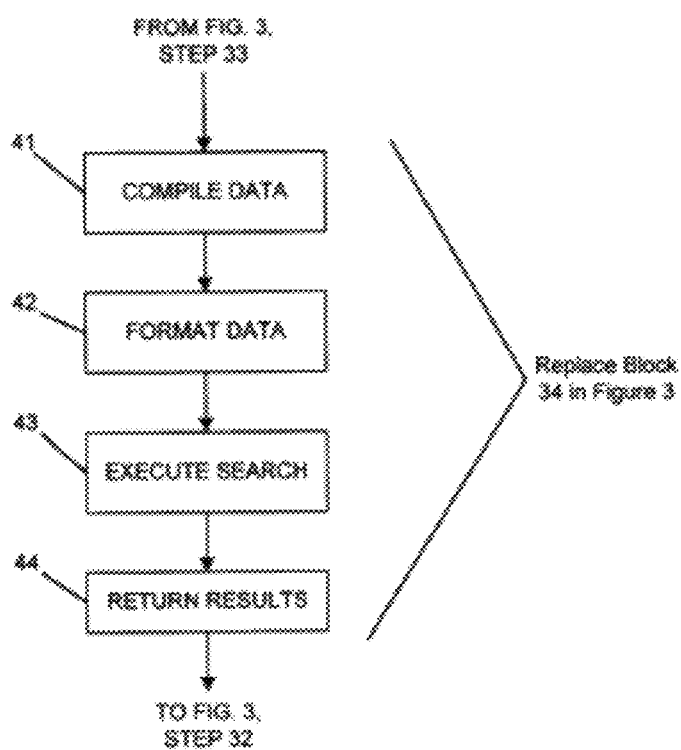
FIG. 4 is a flow chart showing another process in accordance with the present invention.
Figure 6:
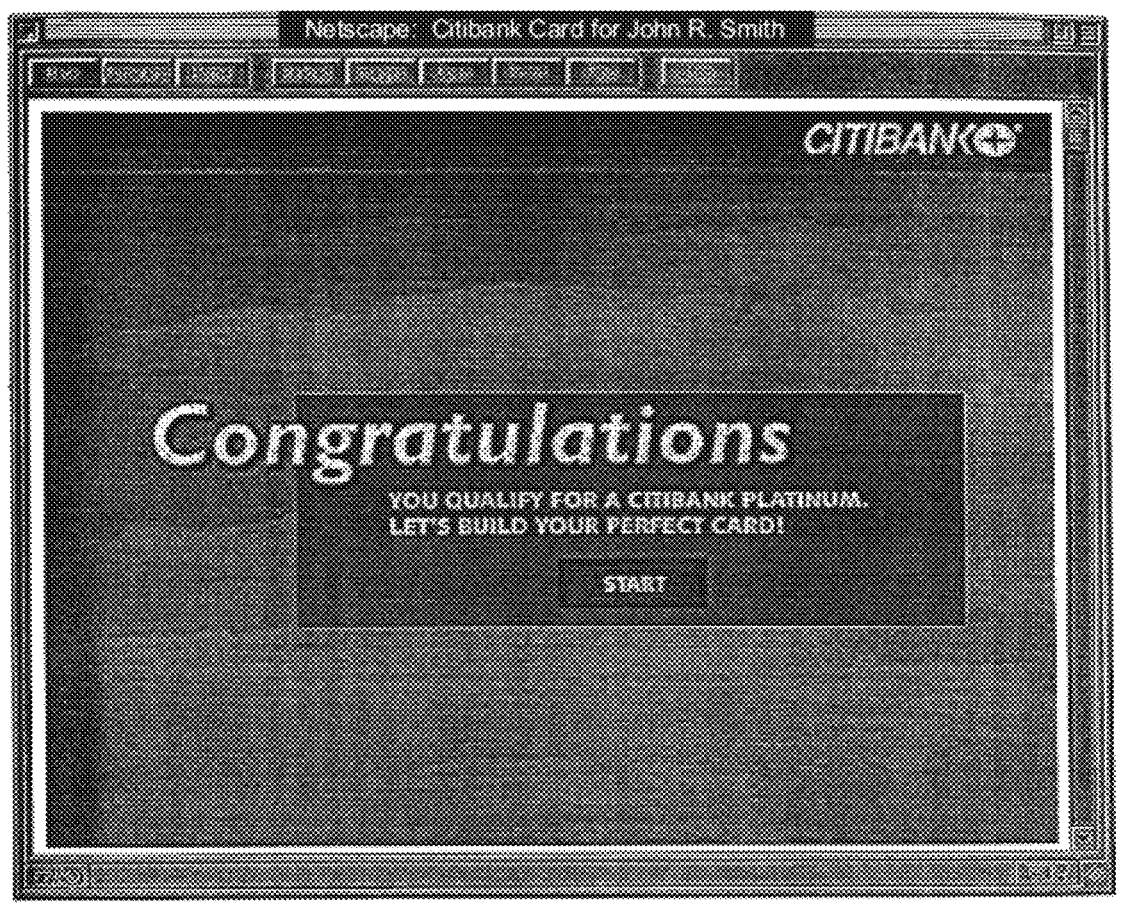
Figure 7:
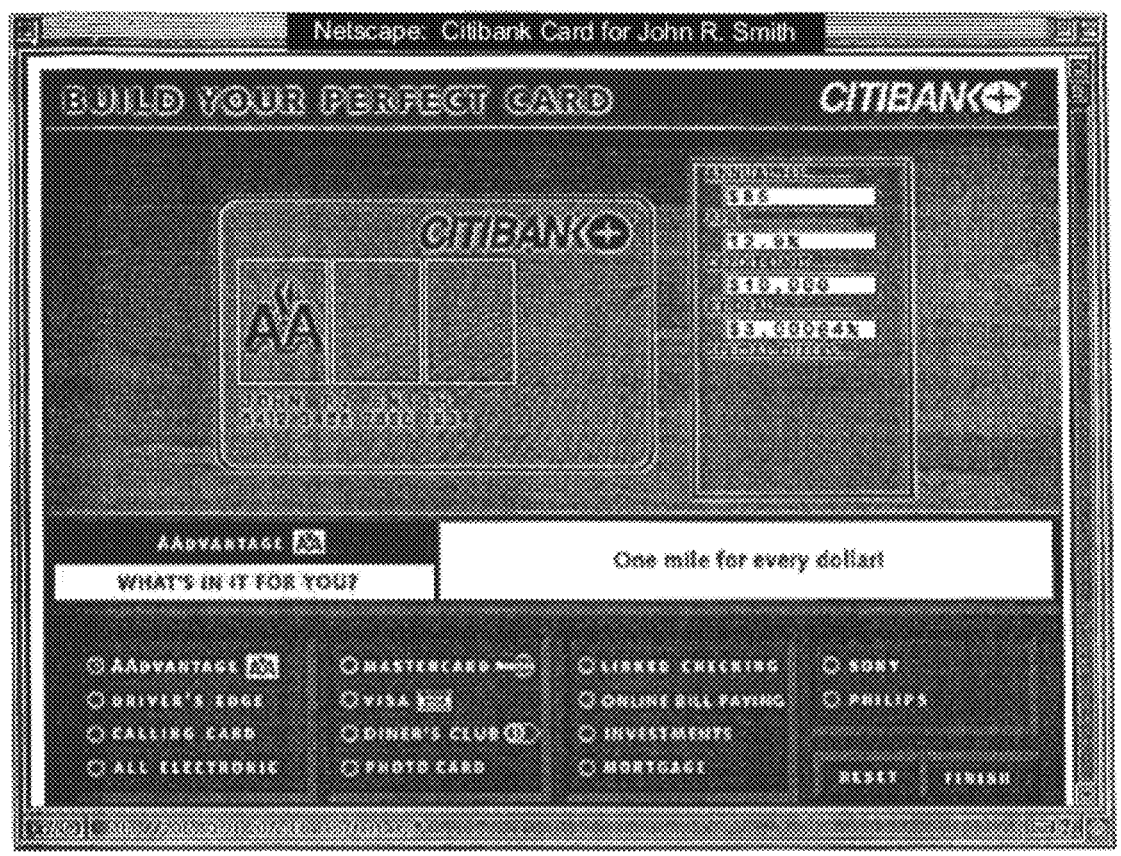
Figure 8:
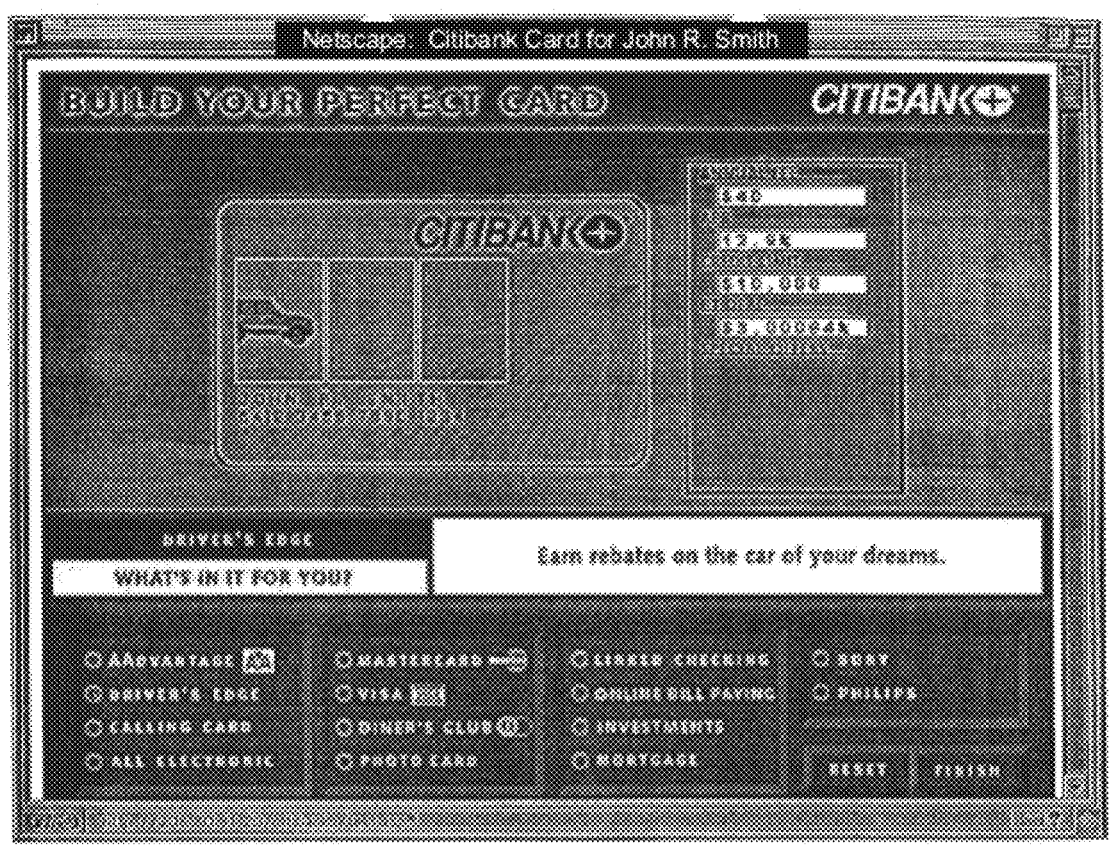
Figure 9:
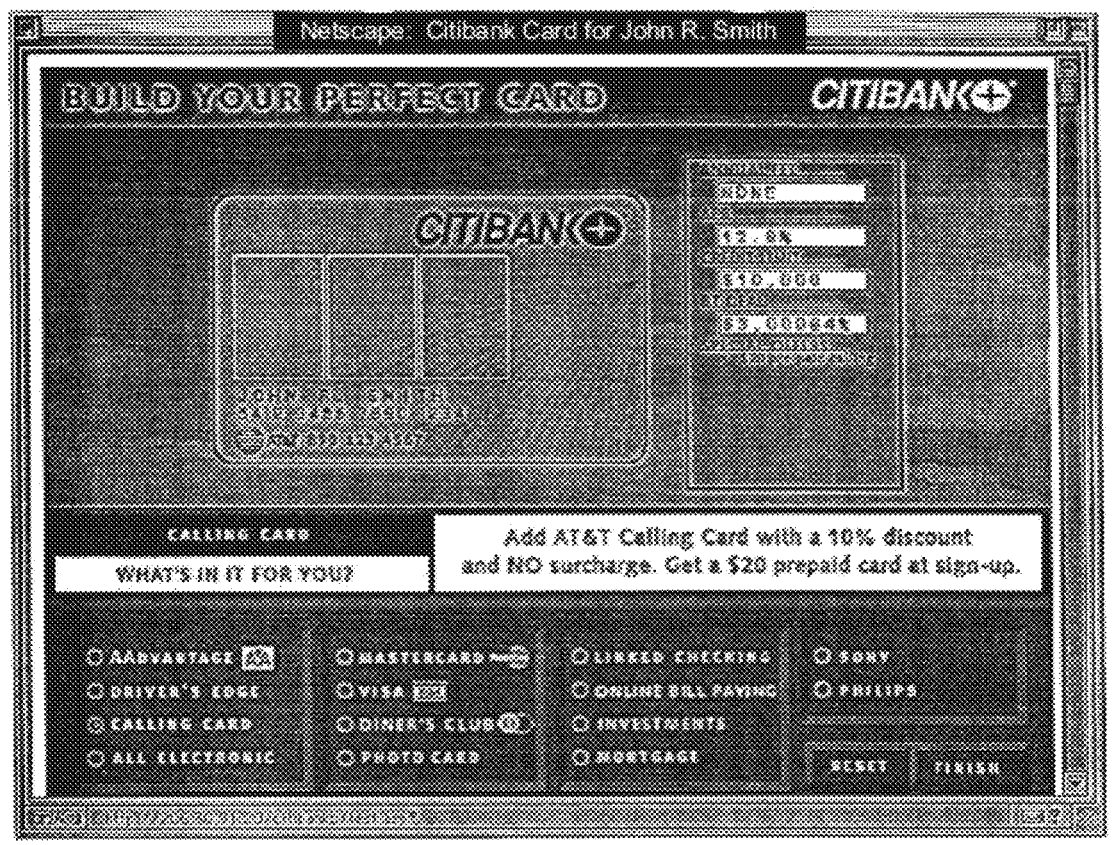
Figure 10:
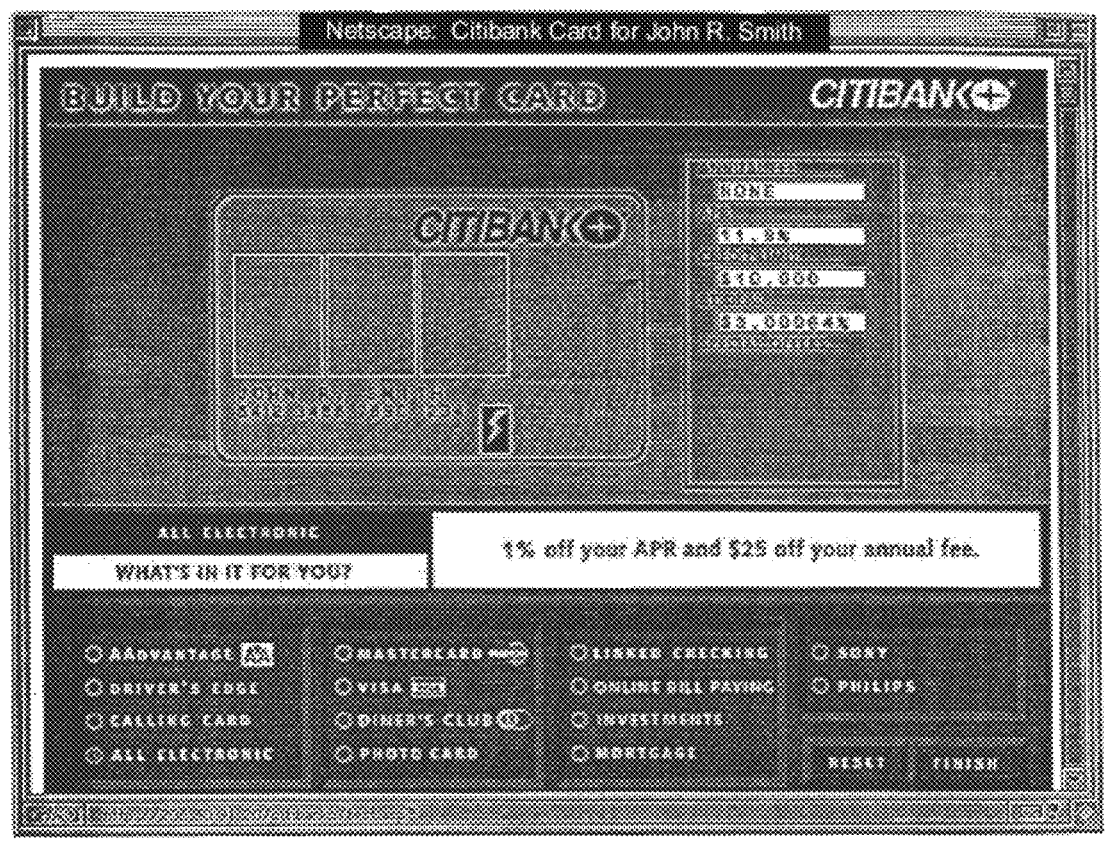
Figure 11:
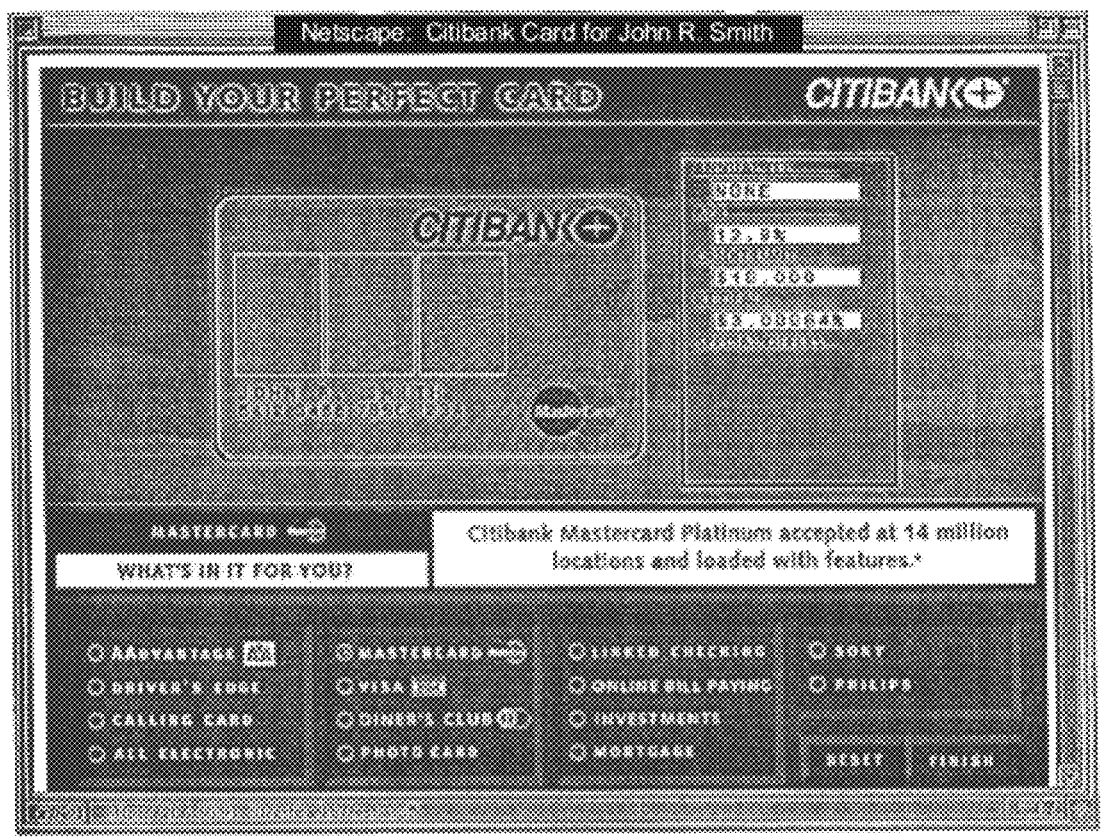
Figure 12:
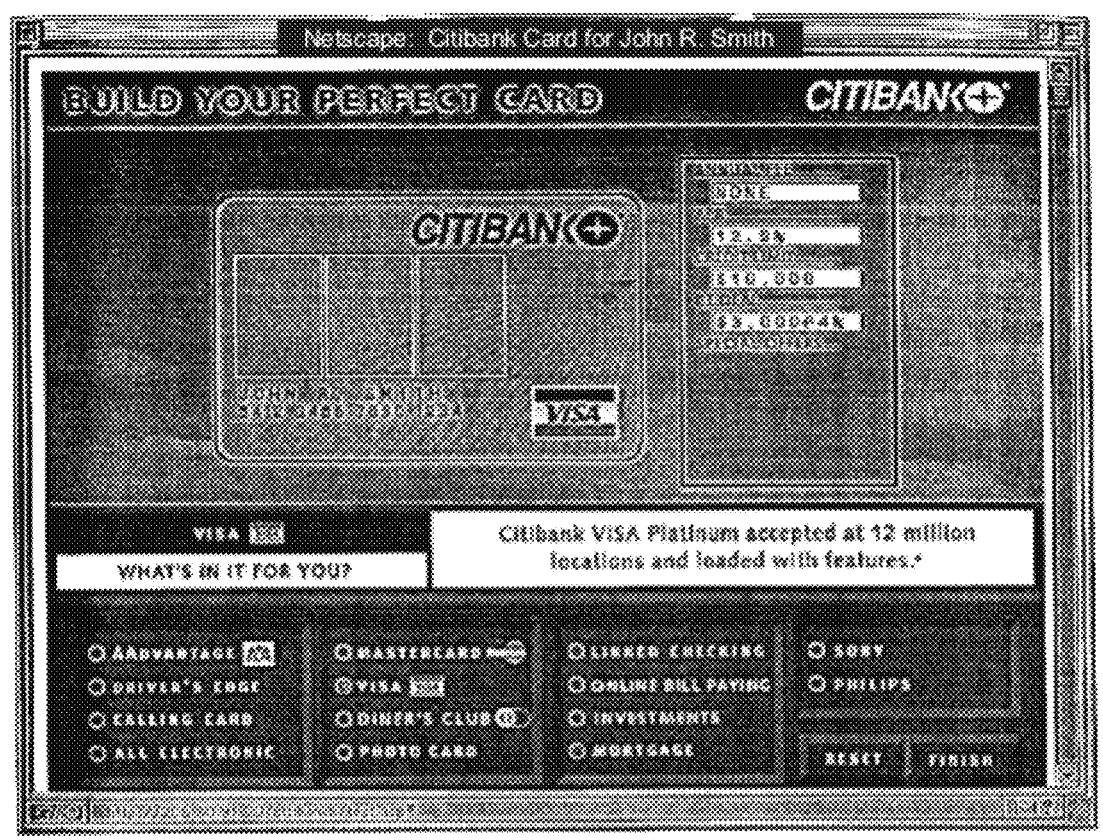
Figure 13:
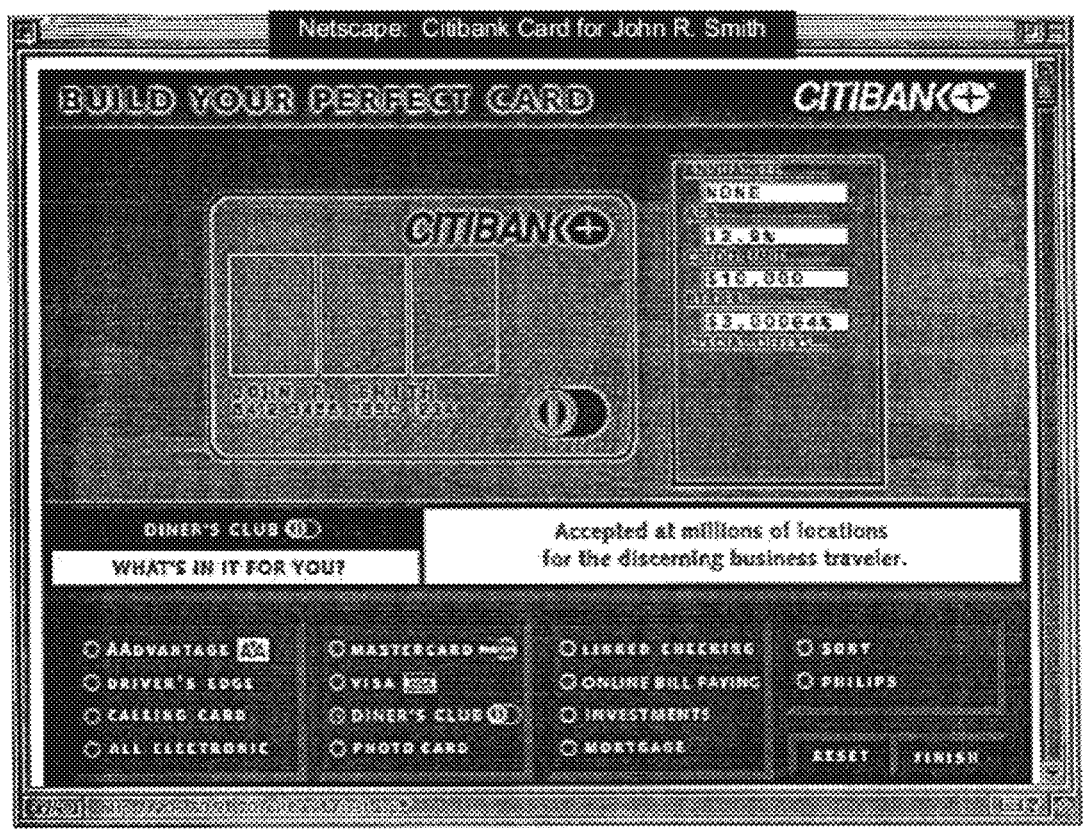
Figure 14:
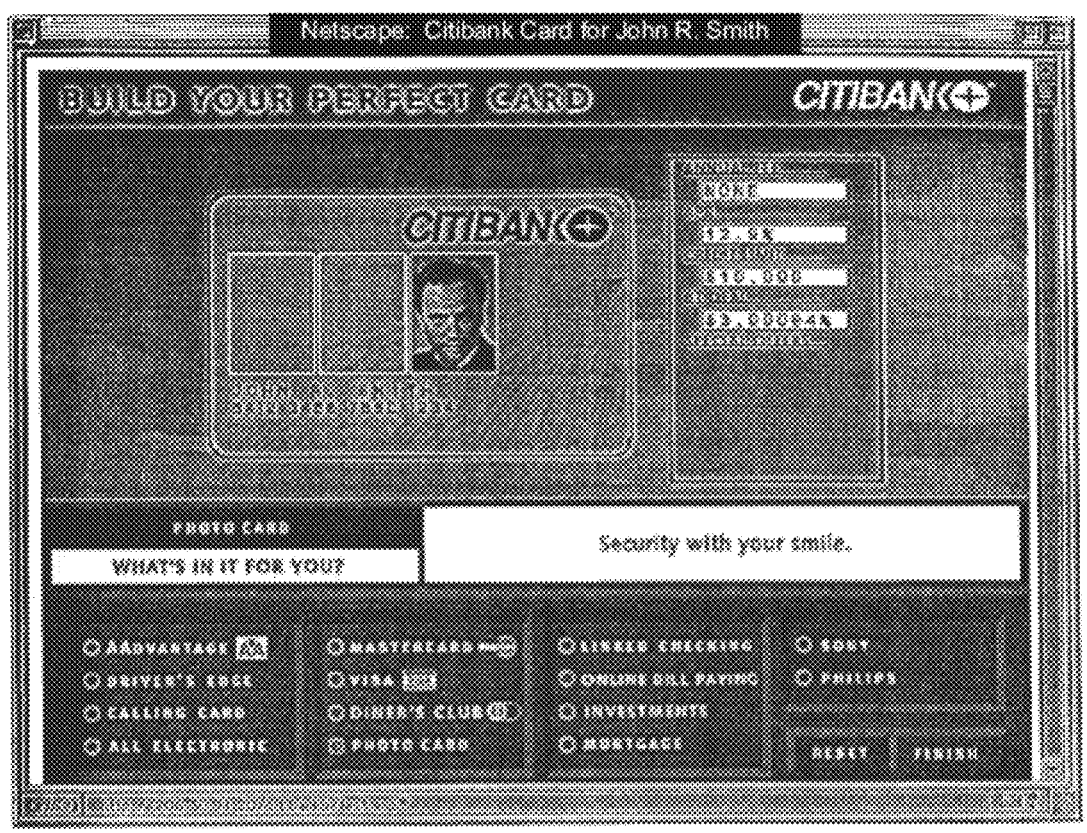
Figure 15:
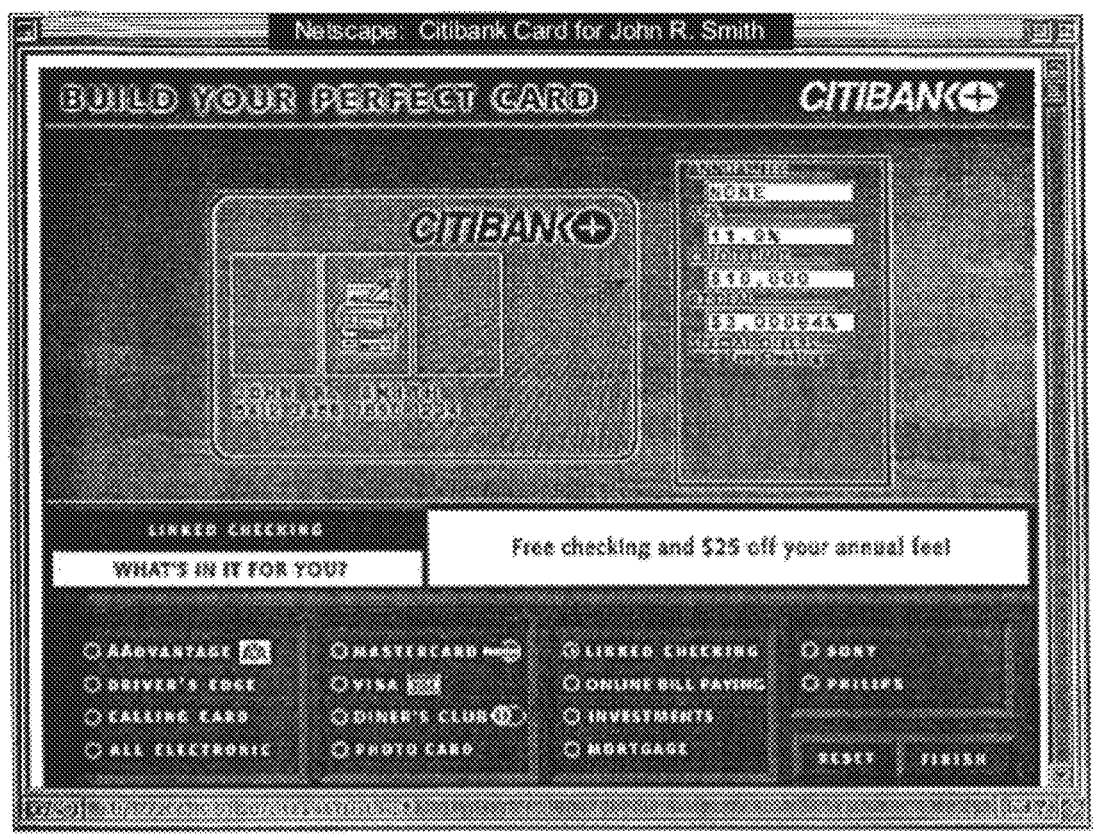
Figure 16:
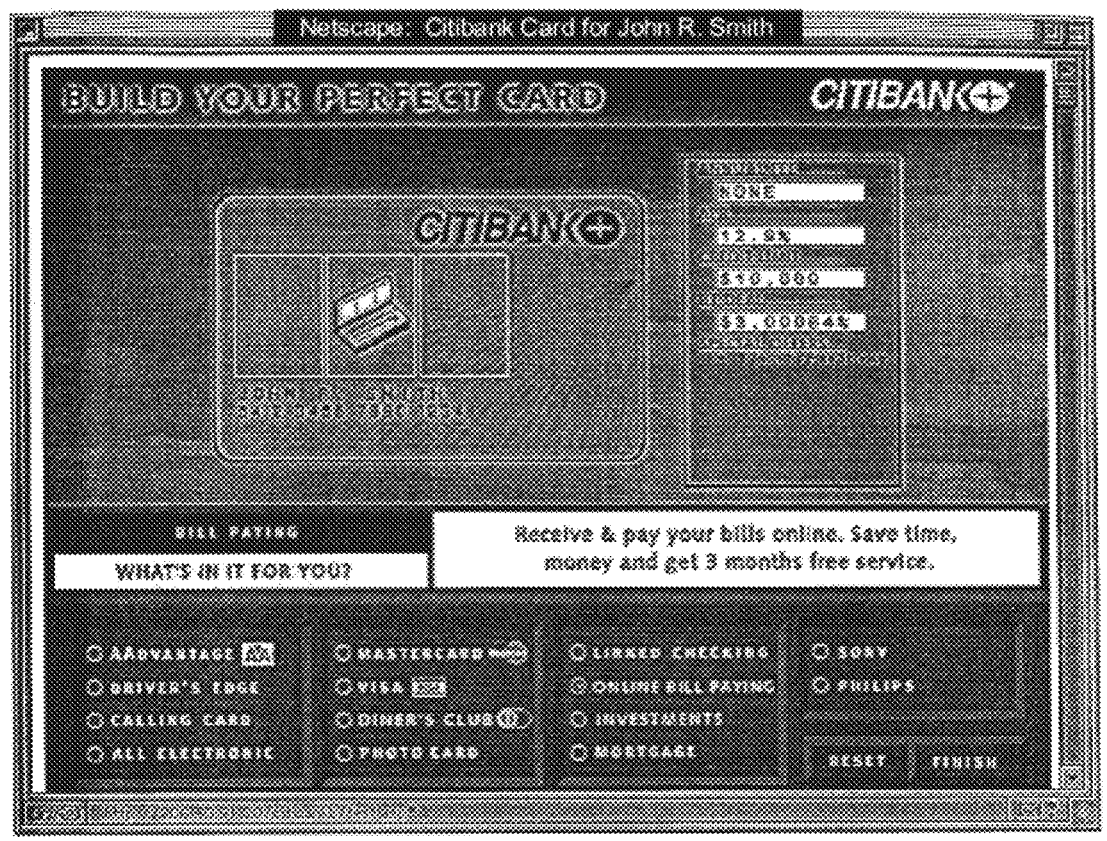
Figure 17:
Figure 18:
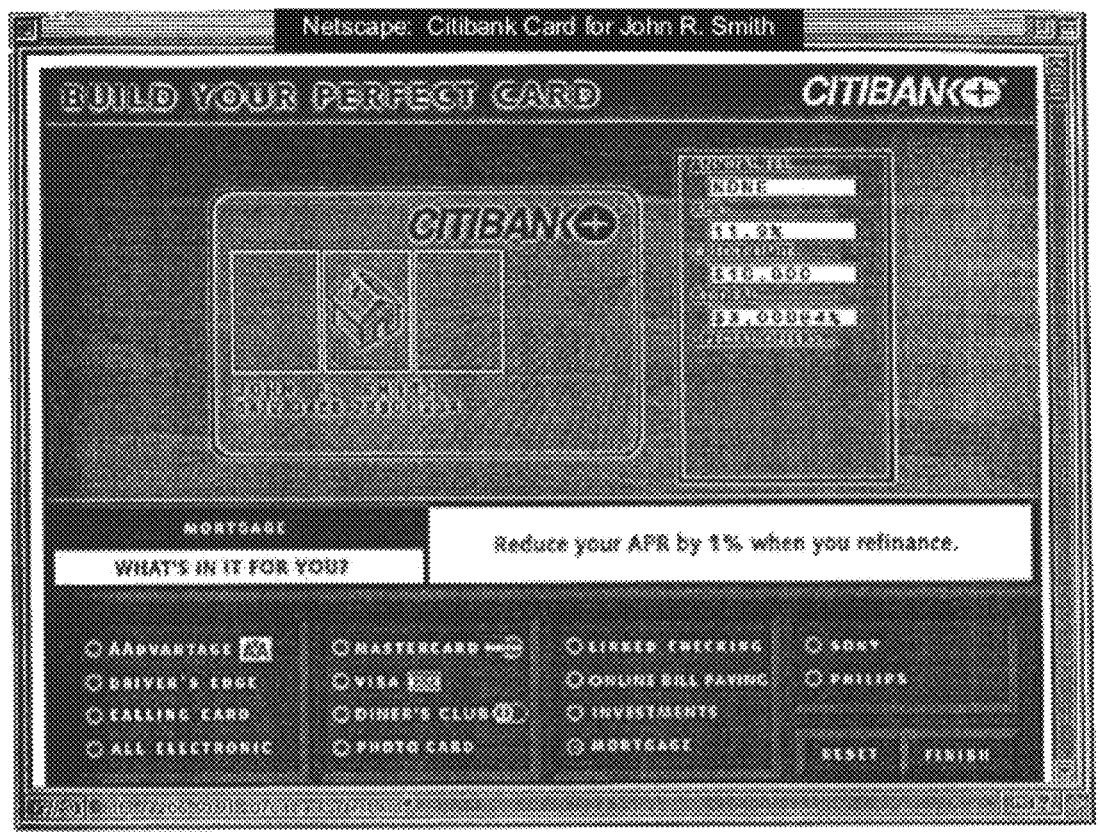
Figure 19:
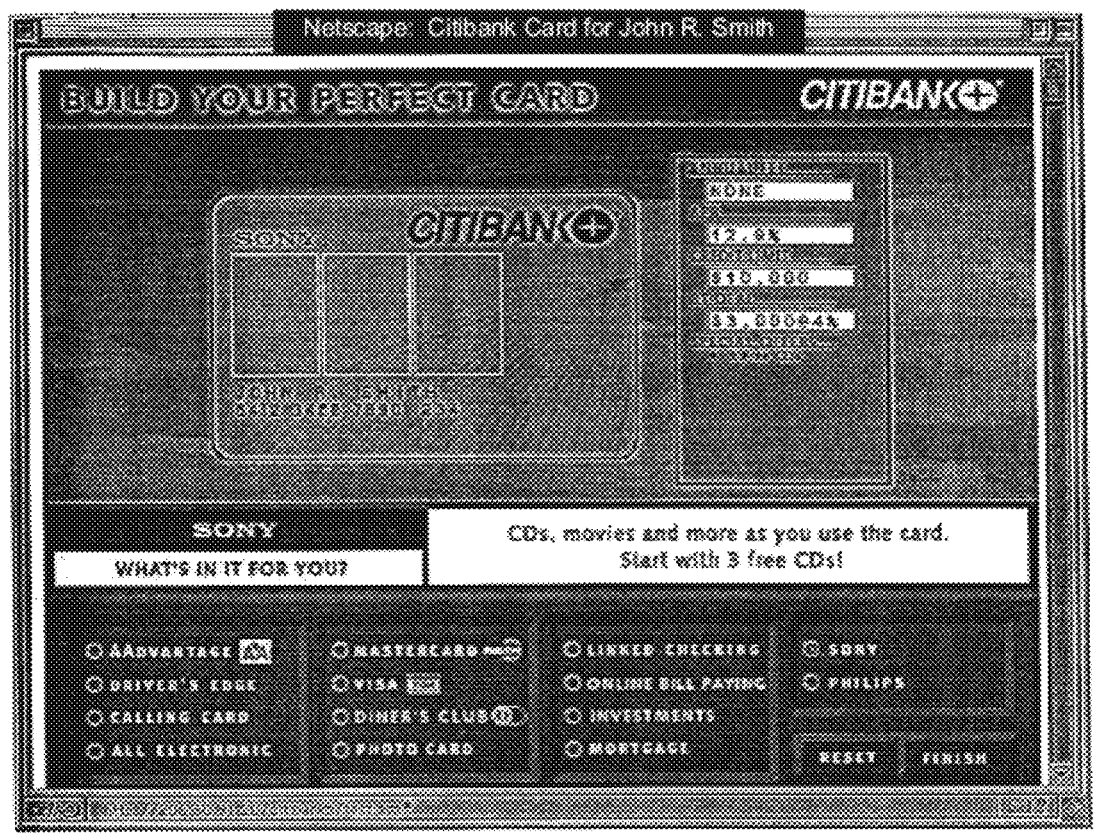
Figure 20:
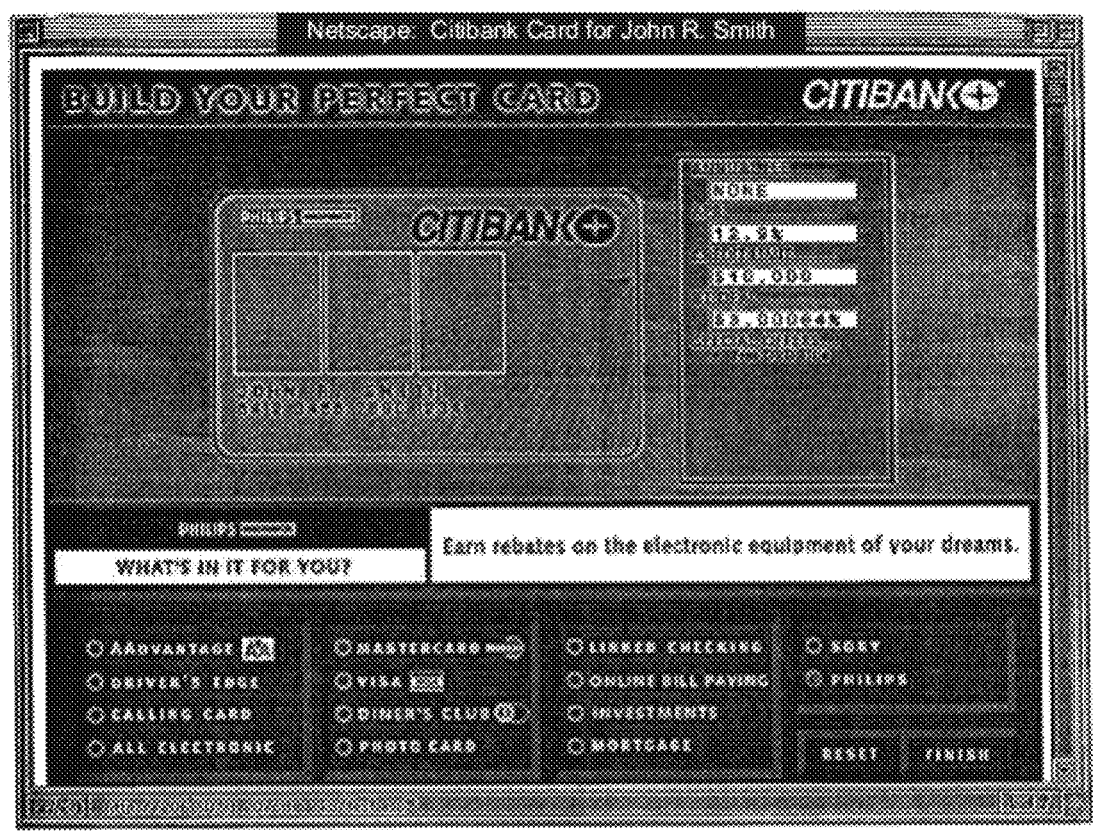

The details of block 34 at FIG. 3 are shown in FIG. 4. At block 41, card building subsystem 2d compiles two separate sets of data. The first set of data encompasses the selection just made by the applicant. The second set of data encompasses the selections previously made by the applicant. Card building subsystem 2d formats both sets of data into a search phrase that database 5 understands. This could be a Structured Query Language ("SQL") phrase, which is submitted to database 5. Whatever the format, the phrase and/or terms that database 5 understands are forwarded to database 5 at block 42. At block 43, database 5 executes the search. Searching in database 5 involves two sub-blocks. The first sub-block includes using logical rules to determine which data elements from the database should be retrieved for a particular query. This is apparent given the large number of options, services and benefits an applicant has to choose from. For example, the annual fee for a card with frequent flyer miles and a calling card option may be lower than a card with frequent flyer miles and points towards the purchase of a new automobile. Database 5 understands that when given data X and data Y (e.g., frequent flier miles and points towards an automobile), it is to retrieve a different value for an annual fee, for example, than when given data X and data Z (e.g., frequent flier miles and points towards electronic goods).

In order to do this, database 5 contains logical operations and conditional statements in addition to the raw data. Thus, the database determines which data element to retrieve when given certain input values which are applied against certain logic rules and expressions.

The second sub-block includes simply forwarding the correctly retrieved data elements to the requesting system or server. Database 5 performs both sub-blocks at block 43.

Blocks 43 and 44 may also be performed by external databases, such as the ones coupled to other company servers and systems 8 in alternative embodiments of the present invention. In this manner, data such as bonuses for applying for specific credit cards (e.g., X minutes free when card is built as a calling card) can be attached directly from outside sources. By providing this access to external databases, the system and the method of the present invention are also variable depending on the needs and desires of business partners of the card issuing institution. For example, a phone company may give away 10 free minutes this month to new applicants who use the present invention but change this service to 20 free minutes next month for new applicants on its own database. By using the phone company's database to hold modifications to the service provided by the phone company to the card issuing institution, the phone company may change at will the service provided without needing to alter the card issuing service's database.

At block 44, database 5 returns the results to the card building system. The card building subsystem 2d updates the display by providing the updated annual fee, APR, BT and APR for BTs.

After the display and credit card file are updated, the process returns to block 32 of FIG. 3 and waits for an applicant input. By displaying the updated annual fee, APR, BT amount and the APR for BTs and returning control to the applicant at block 32, the applicant then is allowed to select and de-select services, view the corresponding changes made to the annual fee, APR, amount available for BTs and the APR for BTs, and make adjustments to the credit card until the applicant is satisfied with the services, options and benefits associated with the card. Once the applicant is content with the services, options and benefits shopped for in exchange for the received annual fee, APR, BT amount and APR for BTs, the applicant indicates that the building of the card is finished at block 32, and the processing continues as mentioned above in conjunction with blocks 35 and 36.

Given that there are so many services and options from which an applicant may choose, it is quite possible that the applicant may not know what is associated with each service or option. Card building subsystem 2d provides information to the applicant regarding each service or option when the mouse or other pointer device is placed over an option or service. Without clicking or striking ENTER, the card builder subsystem automatically provides information about that service in either a pop-up window (a temporary window that appears over the cursor on the screen), or it provides the information in a permanent window specifically designed to display the information. Alternatively, the information about a service or option may be provided in a permanent window and the brief description appears in the window as the applicant selects that service or option.

Description of External Services or Discounts

External services involve goods and service provided to the applicant from a company other than the card issuing institution. Examples include an airline offering frequent flier miles, a car company offering points or dollars off a new car purchase, a company offering points or dollars off purchasing electronic equipment or compact discs, and a grocery store offering dollars off purchases. The card holder earns frequent flier miles, points or dollars off a purchase by using the credit card to make purchases. Typically, a card holder receives one point for every five dollars or one frequent flier mile for every dollar charged on the credit card.

Additionally, an applicant may receive discounts on rates from one or more companies if goods or services are purchased from both companies. For example, if insurance company A and phone company C have an agreement to promote each other's goods and services, someone who buys goods and services from both receives reduced rates or discounts from one or both companies.

In conjunction with co-branding and other agreements between companies is the feature of an embodiment of the present invention that allows links to servers operated by or maintained for other companies. This way, the other company may alter its fees for services or discounted rate without the need to update the card issuing institution's database or server. For example, a long distance phone company may alter the amount of free calling card minutes allotted for new credits cards being built for applicants who choose to associate the calling card service to their credit cards. Thus, depending on when the applicant builds the credited card, the applicant may receive $10 worth of free calling card minutes today, while an applicant applying tomorrow may get $15 worth of free calling card minutes.

Description of Internal Services

Internal services are those provided to the card holder by the card issuing institution. Examples include points or dollars towards the purchase of a new automobile (not affiliated with any particular car company), discounts on hotels and airline tickets, and discounts on purchases made when using the credit card. The distinction between external and internal services is not necessarily the type of service offered, as both may be equal, but rather it is which company or institution is supporting that service. An internal service is provided by the card issuing institution, while an external service is provided by any company that is not the card issuing institution.

Description of Card Enhancements

An applicant may also choose to add enhancements to the credit card. Examples of enhancements include the addition of a microchip and a photograph. The microchip increases functionality of the credit card due to its computing power and additional memory, while a photograph of the card holder enhances the security of the card in that it is harder for someone else to use it.

The photograph can either be in an electronic form provided by the applicant to card building subsystem 2d over the network 3, or the applicant may mail the photograph to be attached to the credit card later.

Description of Options

Options involve linking a service the applicant currently uses with the card issuing institution. Examples of linkable services include checking accounts, electronic bill paying, electronic banking, investments and mortgages. Thus, an applicant who has one or more of these services with the issuing institution may be offered a lower annual fee, lower APR, a higher balance transfer amount or a lower APR on any balance transfer in an effort to get the applicant to do more business with the issuing financial institution Description of Benefits Benefits are not items selected by an applicant, but rather services automatically provided by the card issuing company. Typically a benefit is provided when the applicant has selected a minimum threshold of services or options. An example of a benefit is on-line account checking, such that the card holder may access the appropriate Web site on the card issuing institution's server to see this month's or previous month's charges, in addition to the overall balance due and the prospective due date for payment. These benefits may be given to an applicant if the applicant selects both frequent flier miles and points towards an automobile, for example.

Benefits typically are features that accompany a selected service or option. For example, should the applicant select on-line banking, checks may be provided every month to be used to pay off balances on other credit cards. This benefit is not typically selectable by itself but rather it comes as a bonus for having selected the option of on-line banking.

System Check

The system does a continual check as the potential card holder selects and deselects services and options. Thus, a high credit risk applicant is warned when too many services and options are selected, which drive the annual fee of the card to a prohibitively high level for the applicant's credit worthiness. Should this occur, the applicant is then required to deselect an option or service before selecting any additional services or options on the credit card or submitting the application for final processing.

Other Transaction Media

While the above description is made with reference to a credit card, other types of cards may also be used. For example, Automated Teller Machine ("ATM") and debit cards could also be designed as described above, such that every time the card holder uses the ATM card to make a purchase, incentive points towards services the card holder selected to have associated with the card would be earned. Additionally, an electronic commerce account may also be established with various services, options, discounts and benefits, as discussed above.

One difference with using the described invention with ATM cards is the change in credit scoring provided by the external sources 6a and 6b. In this application, the present invention checks for the existence of an account or accounts that can be used in conjunction with the ATM card instead of obtaining a credit report.

Insurance Account

FIG. 27 is a screen an applicant sees if an insurance provider uses the present invention for applicants to purchase a new insurance policy or update an old policy.

The insurance company's name, and perhaps a logo, appear in section 270. A summary of the types of insurance selected by the applicant is shown in section 271. This section shows updated fees as the applicant selects new and different features and policies. Section 272 provides the applicant's name and number. Section 273 is where an applicant selects between home owner's and renter's insurance.

The applicant may select more than one amount in section 274 to arrive at a new cumulative amount of coverage. For example, if the user selects both $300,000 and $50,000, the applicant is purchasing a home owner's or renter's policy worth $350,000.

Section 275 is the section where the applicant chooses auto insurance. A selection is made for an amount of personal injury and property (PIP) 276, collision (if desired) 277 and comprehensive insurance 278. In section 279, the applicant selects an appropriate amount for a life insurance policy. Button 283 allows the applicant to erase all selections made, and button 284 submits the applicant's selections for final processing so the policies are properly issued to the applicant. Section 285 provides explanations of what the various policies cover, as well as describing the additional services, options and benefits (280-281) provided to the applicant.

What is similar between the insurance account-based embodiment of the present invention and the credit card based embodiment of the present invention is the flexibility the applicant has in selecting which policies are desired and at what amounts of protection. For example, a first applicant may only desire home owner's insurance at the quoted fee, while a second applicant may desire to take advantage of reduced fees by purchasing both a home owner's policy and an automobile policy. It should also be noted that the insurance company may offer a reduced rate to the second applicant in the automobile policy only, in the home owner's policy only or in both policies.

Beyond selecting strictly internal policies, the applicant also has the ability to take advantage of co-branding agreements or other agreements between companies. For example, if the applicant also uses telephone service provided by Company X, the applicant may be able to take advantage of reduced policy rates from insurance company A pursuant to an agreement between company X and company A. Similarly, by clicking on section 281, the applicant may again receive reduced policy rates if the applicant has an investment portfolio with company Y.

Additionally, the applicant may also desire to pay policy fees via electronic banking or automatic payment by selecting section 282. Because this option reduces the amount of paperwork the insurance company needs to process, the insurance company provides the applicant with a flat fee, such as $5.00, discounted from the total policy fees.

The process blocks an applicant proceeds through in selecting the various insurance policies is virtually identical to process blocks an applicant passes through in purchasing a credit card, with a few minor exceptions. (See, for example, FIG. 3 and accompanying description.) The insurance company still establishes some form of a firewall (block 22) and checks the insurability of the applicant (block 27), so as to determine if the applicant, for example, is a bad driver or has a dangerous occupation. Alternatively, the system also obtains information regarding other insurance policies to eliminate an applicant from insuring an asset two or more times. The insurance based system receives data from the various outside services, such as records from a department of motor vehicles looking for speeding tickets, drunk driving convictions, any outstanding mortgages on the home to determine the value of the home for insurance purposes, and other insurance company's databases to determine if the asset is already insured.

Once the system of the present invention has a rough profile of the applicant, the applicant is provided access to the screen shown in FIG. 27 with some preliminary data established such as a minimum PIP requirement for the state in which the applicant lives. The applicant makes selections (block 33), and the system adjusts fees.

Figure 28:
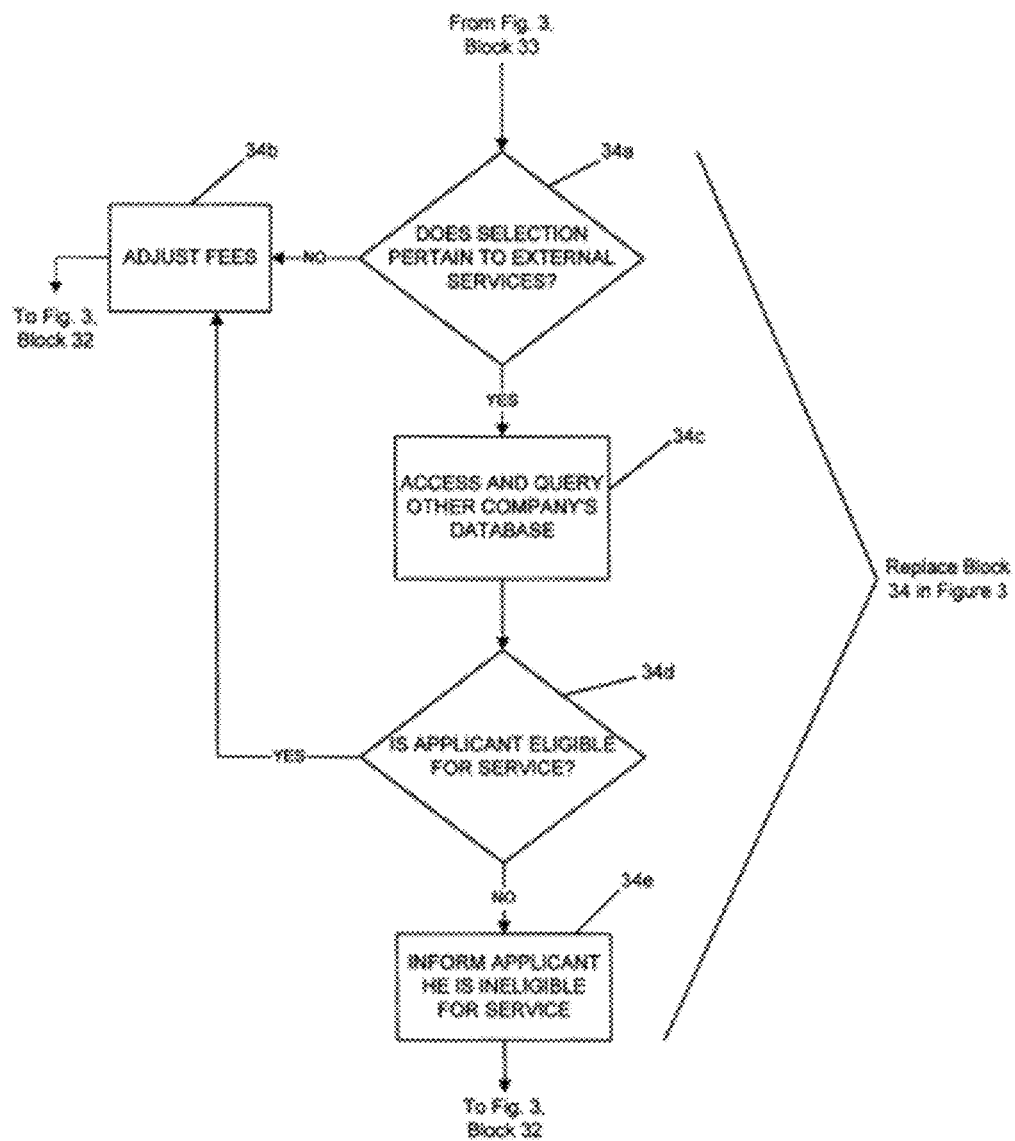
FIG. 28 is a flow chart showing a sub-process in accordance with the present invention.

In this embodiment, the fee adjustment sub-process is shown in FIG. 28, which replaces block 34 of FIG. 3. At block 34a, the system determines if the applicant selected an external service (i.e., 280-282) or an internal service (everything else). If the service selected is an internal service, the system of the present invention makes adjustments to the fees, as described above at block 34b, and waits for the applicant to make another selection at block 32 of FIG. 3.

If the service selected is external to the insurance issuer's business, the insurance company's server accesses another company's server via a network. Thus, if the applicant alleges to be a user of company X's or company Y's services, the insurance company's server issues a query to obtain verification that the applicant uses those services at block 34c. If the computer determines the applicant currently uses the goods and services of company X or Y, the fees are adjusted based on data obtained from either the insurance company's server or data provided by the other company's server, at block 34c. After the fees are adjusted, the applicant makes another selection at block 32 of FIG. 3.

Should the applicant decide to take advantage of automatic payments, the insurance company's server prompts the applicant for a checking account number and bank name. The insurance company's server uses this information to access the appropriate banking server to determine if this applicant has such an account and if the balance is enough to cover the payments being incurred by the new or updated insurance policy(ies). Once it is determined that the applicant is eligible for automatic payments at block 34d, the present invention adjusts the fees at block 34b and then waits for the applicant to make another selection at block 32 of FIG. 3.

If the applicant is ineligible for these external services, the present invention sends a message to the applicant's screen at block 34e informing the applicant that he/she is not able to take advantage of that service or reduced rate at this time. This message could be in the form of a pop-up window, or it could appear in the explanation section 285. After the applicant is informed of ineligibility, the system waits for the applicant to make another selection at block 32 of FIG. 3.

Communications Services

Figure 29:
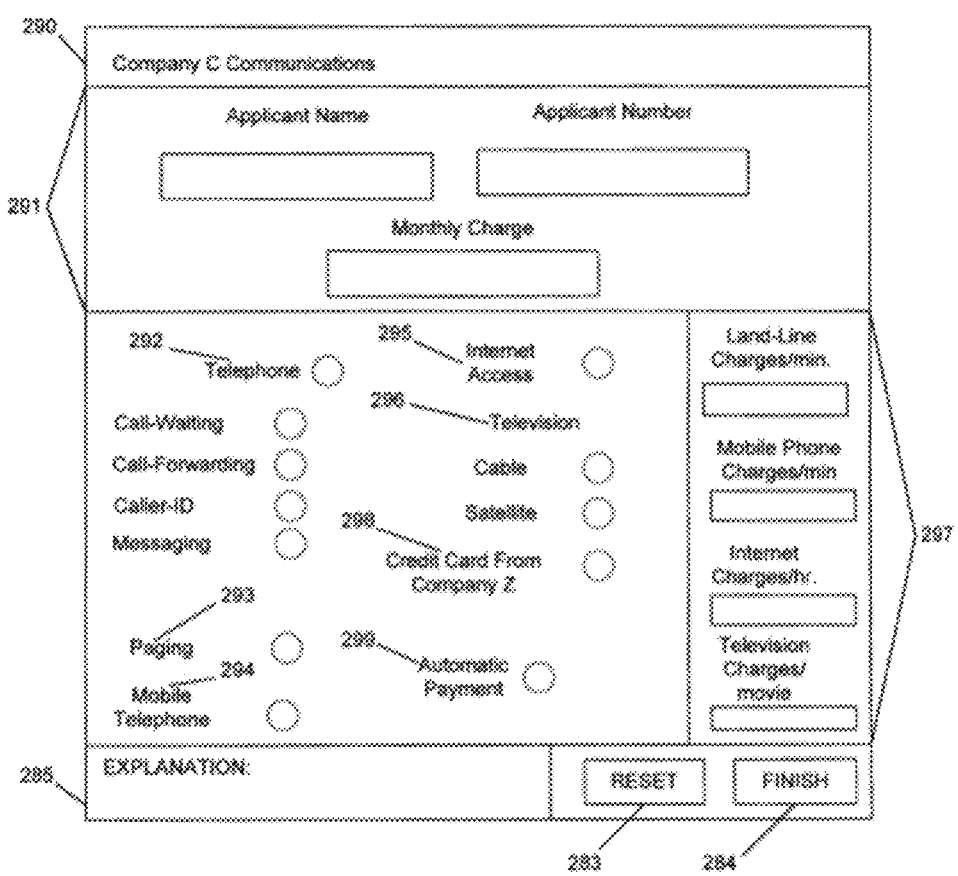
FIG. 29 is a diagram of a screen showing various options an applicant has to choose from when using the systems and methods of the present invention to purchase telecommunications services.

FIG. 29 is a screen an applicant sees when communication services are purchased using an embodiment of the present invention.

The communication company's name, and perhaps a logo, appear in section 290 of the screen. In section 291, the applicant's name, number and present monthly charges are displayed. The monthly charges typically include elements such as the fees for having a land line in the residence or office, a flat internet access fee per month, as well as the monthly charges for television service, either satellite, cable or broadcast.

In section 292, the applicant selects which telephone services is desired. In section 293 the applicant selects whether or not paging services are wanted. Section 294 is where the applicant selects to have mobile telephone service or not, while in section 295 the applicant selects whether or not to receive internet access from this communications company. In section 296, the applicant selects which, if any, television service is desired.

In section 298, the applicant informs the communications company about any credit cards the applicant carries with company Z. The communications company server issues a check (see description of insurance service above) to determine if the applicant is carrying a credit card from company Z. If the applicant is carrying such a credit card, the applicant receives discounted monthly charges or discounted per use charges, described below. Either the communications server provides the discounted rate, or the credit card company's server provides the discounted rate.

In section 299, the applicant selects whether or not to pay the bills accrued using these selected communications services via an automated payment service. Again, like the insurance system described above, if the applicant select this option, the applicant receives some discount on either the monthly charges or per use charges, as described below.

Sections 283 and 284 allow the applicant to clear the selections made, as well as submit the completed account information for final processing. Section 285 is a place for the server to provide information regarding the various services and options to the applicant.

Section 297 displays the per use charges the applicant is charged. Examples include the rate per minute for phone calls, both land-line based and mobile, internet charges per hour and charges per movie.

One distinction with the communications embodiment of the present invention from the other account-based embodiments is the adjusting of both monthly fees and per usage fees. Thus, a first applicant who only purchases telephone service from company C may be charged 10 cents per minute for land-line based phone calls, while a second applicant may receive 9 cents per minute for land-line based calls if television service is selected along with the phone service.

External Service Updates

Since many of the account applications involve agreements with other companies, a periodic monitoring system is necessary to be sure each applicant is receiving the correct rate. Therefore, once every month or quarter, the two servers communicate and swap information regarding who has added services and who has dropped services. In this manner, an applicant who applies for a credit card in January and phone service in March receives the benefit of lower fees in March or thereafter by virtue of buying services from the credit card company and the phone company who are in an agreement with each other. Thus, these companies promote each other's goods and services.

Similarly, a credit card applicant who purchases phone service from a co-branded company at the time of applying for the credit card, but later switches phone service, receives the non-discounted credit card rates sometime after cancelling the phone service with the telephone company.

While the present invention has been described above through the use of specific examples, it is understood that obvious variations may occur to those of ordinary skill in the art without departing from the scope of the invention as set forth by the appended claims.

The invention claimed is:

1. A computer-implemented method of offering a customized credit account, the method comprising:
   presenting, by a computer, a web page to a user providing an option to apply for a baseline offer for a credit account;
   upon receiving a selection from the user to apply for the baseline offer, requesting by the computer information to check the credit worthiness of the customer;
   upon receiving a credit worthiness above a predetermined threshold, presenting, by the computer, an option to the user to customize the baseline offer of the credit account;
   presenting, by the computer, a web page to the user providing the user with an option to select a reward feature;
   automatically adjusting, by the computer, an annual percentage rate of the credit account based upon the user's selection of the reward feature;
   presenting, by the computer, a web page to the user providing the user with an option to select an account based service;
   automatically adjusting, by the computer, the annual percentage rate of the credit account based upon the user's selection of the account based service; and
   upon completion of customization of the account, issuing, by the computer, a credit account to the user available for immediate use on the internet.

2. The method according to claim 1, further comprising:
   receiving personal information from the user; and
   determining a qualification based on the received personal information.

3. The method according to claim 2, further comprising using the qualification to limit a set of options available to the user.

4. The method according to claim 2, further comprising using the qualification to form the baseline offer.

5. The method according to claim 2, further comprising not providing the baseline offer dependent upon the qualification.

6. The method according to claim 2, wherein the qualification is a credit line.

7. The method according to claim 1, wherein the credit account is a credit card account.

8. A computer-implemented method of offering account based services comprising:
   presenting, by a computer, a web page to a user providing an option to apply for a baseline offer for a first account based service;
   upon receiving a selection from the user to apply for the baseline offer, requesting by the computer information to check the credit worthiness of the customer;
   upon receiving a credit worthiness above a predetermined threshold, presenting, by the computer, an option to the user to customize the baseline offer of the first account based service;
   presenting, by the computer, a web page to the user providing the user with an option to modify a first feature of the first account based service;
   automatically adjusting, by the computer, an annual percentage rate or a credit limit of the first account based service based upon the user's selection to modify the first feature of the first account based service;
   presenting, by the computer, a web page to the user providing the user with an option to modify a second feature of the first account based service;
   automatically adjusting, by the computer, an annual percentage rate or a credit limit of the first account based service based upon the user's selection to modify the second feature of the first account based service; and
   upon completion of customization of the account, issuing, by the computer, a first account based service to the user available for immediate use on the internet.

9. The method according to claim 8, further comprising:
   receiving personal information from the user; and
   determining a qualification based on the received personal information.

10. The method according to claim 9, further comprising using the qualification to limit a set of options available to the user.

11. The method according to claim 9, further comprising using the qualification to form the baseline offer.

12. The method according to claim 9, further comprising not providing the baseline offer dependent upon the qualification.

13. The method according to claim 9, wherein the qualification is a credit line.

14. The method according to claim 8, wherein the account based service is a credit card account.

15. The method according to claim 8, wherein the account based service is an insurance account.

16. The method according to claim 8, wherein the account based service is a telecommunications account.

* * * * *